(12) United States Patent
Baghsorkhi

(10) Patent No.: US 9,690,360 B2
(45) Date of Patent: Jun. 27, 2017

(54) TECHNOLOGIES FOR DISCONTINUOUS EXECUTION BY ENERGY HARVESTING DEVICES

(71) Applicant: Intel Corporation, Santa Clara, CA (US)

(72) Inventor: Sara S. Baghsorkhi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/998,273

(22) Filed: Dec. 26, 2015

(65) Prior Publication Data

US 2017/0045927 A1    Feb. 16, 2017

Related U.S. Application Data

(60) Provisional application No. 62/204,815, filed on Aug. 13, 2015.

(51) Int. Cl.
| | | |
|---|---|---|
| *G06F 11/00* | (2006.01) | |
| *G06F 1/32* | (2006.01) | |
| *G06F 9/45* | (2006.01) | |
| *G06F 11/14* | (2006.01) | |

(52) U.S. Cl.
CPC ............ *G06F 1/329* (2013.01); *G06F 8/4432* (2013.01); *G06F 11/1474* (2013.01); *G06F 2201/805* (2013.01); *G06F 2201/85* (2013.01)

(58) Field of Classification Search
USPC ..................................................... 714/15, 16
See application file for complete search history.

(56) References Cited

U.S. PATENT DOCUMENTS

| | | | | |
|---|---|---|---|---|
| 2009/0307430 A1* | 12/2009 | Bruening | ............ | G06F 12/0862 711/119 |
| 2012/0096292 A1* | 4/2012 | Mekhiel | .................... | G06F 1/12 713/322 |
| 2013/0198495 A1* | 8/2013 | Vick | ....................... | G06F 8/441 712/226 |

* cited by examiner

*Primary Examiner* — Sarai Butler
(74) *Attorney, Agent, or Firm* — Barnes & Thornburg LLP

(57) ABSTRACT

Technologies for discontinuous execution include a compiler computing device and one or more target computing devices. The compiler computing device converts a computer program into a sequence of atomic transactions and coalesces the transactions to generate additional sequences of transactions. The compiler computing device generates an executable program including two or more sequences of transactions having different granularity. A target computing device selects an active sequence of transactions from the executable program based on the granularity of the sequence and a confidence level. The confidence level is indicative of available energy produced by an energy harvesting unit of the target computing device. The target computing device increases the confidence level in response to successfully committing transactions from the active sequence of transactions into non-volatile memory. In response to a power failure, the target computing device resets the confidence level and resumes executing the transactions. Other embodiments are described and claimed.

24 Claims, 12 Drawing Sheets

500

502

```
for (; k < size; k += CR, voLog(&k);) {
    sum = 0;
    voLog(&sum);
    i = 0;
    voLog(&i);
    commit_0();

for(/*i=0*/; i < CR; i++, voLog(&i);) {
        sum += X[k+i];
        voLog(&sum);
        commit_1();
    } nvLog(&X[j], X[j]);
    X[j] = sum;
    j++;
    voLog(&j);
    commit_2();
}
```

504

```
for(; k < size; k += CR, voLog(&k);) {
    sum = 0;
    voLog(&sum);
    i = 0;
    voLog(&i);

for(/*i=0*/; i < CR; i++, voLog(&i);) {
        sum += X[k+i];
        voLog(&sum);
    } nvLog(&X[j], X[j]);
    X[j] = sum;
    j++;
    voLog(&j);
    commit_3();
}
```

FIG. 5A

```
for (; k < size; k += CR, voLog(&k);) {
   sum = 0;
   for (i = 0; i < CR; i++) {
      sum += X[k+i];
   } nvLog(&X[j], X[j]);
   X[j] = sum;
   j++;
   voLog(&j);
   commit_3();
}
```

506

```
for(; k < size; k += CR * BlockSize, voLog(&k)) {
   blockSize = MIN(BLOCK, ...); //get correct size
                                     for last iter
   for (m = k; m < k + CR*blockSize; m += CR){
      sum = 0;
      for (i = 0; i < CR; i++) {
         sum += X[m+i];
      }
      nvLog(&X[j], X[j]);
      X[j] = sum;
      j++;
   }
   voLog(&j);
   commit_4();
}
```

508

FIG. 5B

TECHNOLOGIES FOR DISCONTINUOUS EXECUTION BY ENERGY HARVESTING DEVICES

CROSS-REFERENCE TO RELATED APPLICATION

The present application claims priority under 35 U.S.C. §119(e) to U.S. Provisional Patent Application Ser. No. 62/204,815, entitled "TECHNOLOGIES FOR DISCONTINUOUS EXECUTION BY ENERGY HARVESTING DEVICES," which was filed on Aug. 13, 2015.

BACKGROUND

Typical computing systems include volatile memory such as random-access memory (RAM) coupled to persistent data storage such as hard disk drives or solid-state drives. Volatile memory requires a power source for operation; the contents of volatile memory may be lost when the power supply to a computing system is turned off. Non-volatile storage retains its contents while power to the computing system is turned off.

Currently, tiny computing devices (such as devices that make up an Internet of Things) may use energy sources such as solar, mechanical vibration, and RF signals, and thus may have a power supply that is unpredictable, bursty, and highly intermittent. Existing techniques perform computation with such ultra-low power devices by frequently checkpointing volatile system state and executing long-running programs in small increments when power is available. However, checkpointing the whole program state may involve relatively significant time and energy, which may limit the amount of time available for program execution itself.

Mementos, published in ASPLOS 2011, statically instruments a program with probes—inserted after each loop back-edge and after each function call—that read the available voltage level. At runtime, if the voltage level falls below a certain threshold, the whole program state is backed up into non-volatile memory. Thus, in the Mementos system, updates to non-volatile data are not guaranteed to be consistent after a restart. Additionally, reading Vcc (voltage) may be expensive, and checkpointing the whole program state to non-volatile memory each time may not be efficient. Additionally, transaction sizes are not flexible unless Vcc is probed very frequently. See Benjamin Ransford et al., "Mementos: System Support for Long-Running Computation on RFID-Scale Devices," ASPLOS'11 (Mar. 5-11, 2011).

DINO is based on Mementos. DINO requires the user to manually annotate a program with task/transaction boundaries. Static analysis is used to model the consistency requirements of nonvolatile data as data race conditions in a concurrent program. When execution reaches a task boundary, immediately before checkpointing, DINO makes a volatile copy of each nonvolatile variable that may be written to after a task boundary executes and before another task boundary executes. The amount of non-volatile data that can be logged by DINO is limited by the size of volatile memory in the microcontroller, which is typically small compared to the size of the nonvolatile memory. Similar to Mementos, DINO checkpoints the whole stack and volatile data to non-volatile memory. Transaction sizes in DINO are fixed. See Brandon Lucia & Benjamin Ransford, "A Simpler, Safer Programming and Execution Model for Intermittent Systems," PLDI'15 (Jun. 13-17, 2015).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 5A and 5B are a pseudocode diagram illustrating transactional code with varying granularity;

DETAILED DESCRIPTION OF THE DRAWINGS

Figure 1:
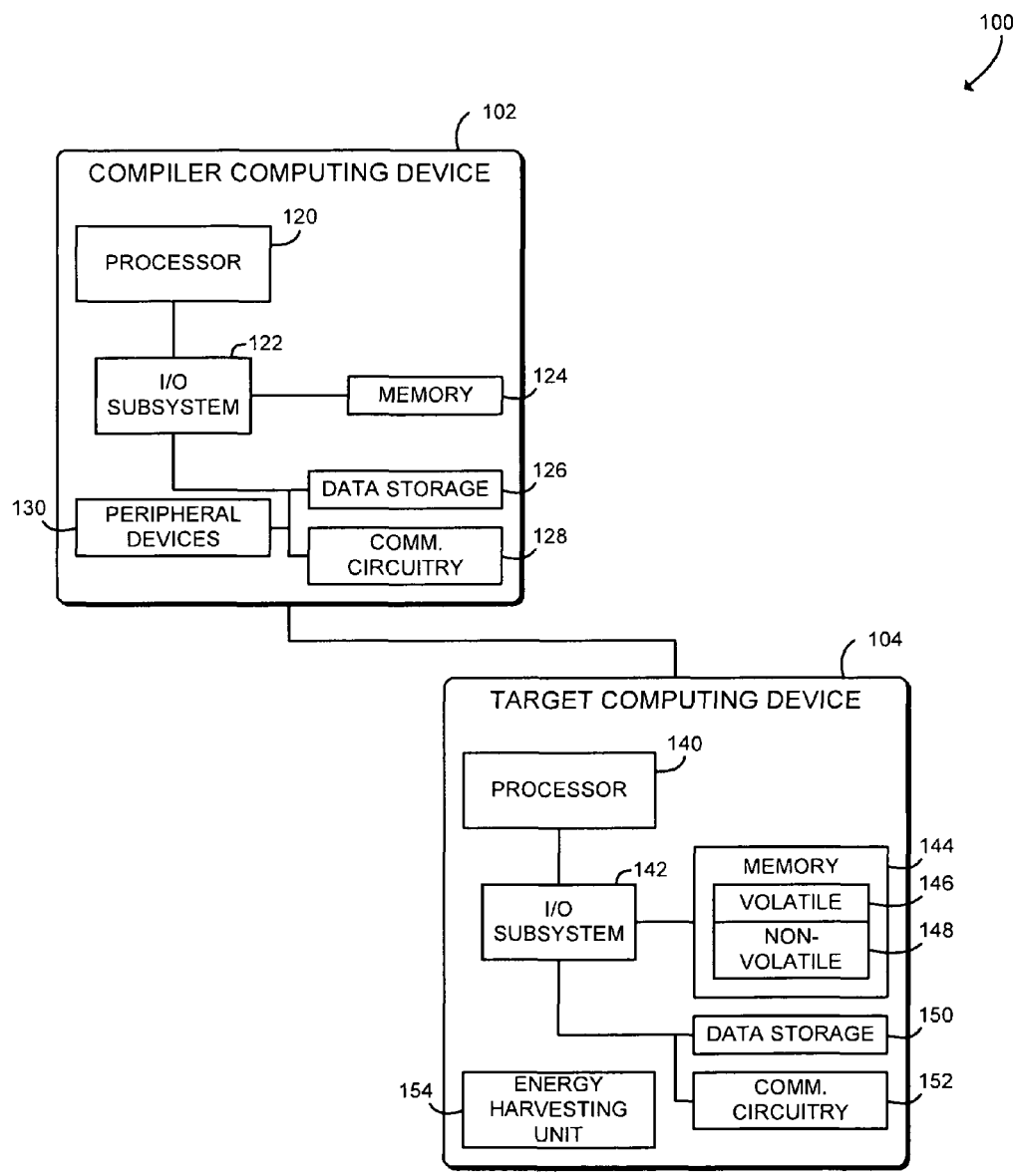
FIG. 1 is a simplified block diagram of at least one embodiment of a system for discontinuous execution by energy harvesting devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 includes a compiler computing device 102 and a target computing device 104. The target computing device 104 may be embodied as a small embedded device (such as a microcontroller) that is powered by an energy harvesting unit. The target computing device 104 may also be referred to as an energy harvesting device 104. The compiler computing device 102 performs static analysis of program code and generates multi-versioned executable code for the target computing device 104. The multi-versioned executable code includes executable code with varying transaction granularity. At runtime, the target computing device 104 switches between code with finer-grained transactions and code with coarser transactions based on available energy. Within each transaction, if there is a power failure before the transaction is committed, all changes made (to non-volatile data) are reversed. On a reboot, the program loads the last consistent version of volatile data from non-volatile memory and resumes execution from the beginning of the last failed transaction. Thus, the system 100 is always left in a consistent state while making forward progress. Thus, the system 100 enables applications running on edge devices such as the target computing device 104 to adapt in real time to energy availability with little effort from application developers. In some embodiments, the system 100 may in addition yield higher performance. A few examples of these applications include digital signal processing, encryption, feature extraction, and classification algorithms.

The compiler computing device 102 may be embodied as any type of computing device capable of performing the functions described herein, including, without limitation, a computer, a laptop computer, a notebook computer, a tablet computer, a smartphone, a mobile computing device, a wearable computing device, a multiprocessor system, a server, a rack-mounted server, a blade server, a network appliance, a web appliance, a distributed computing system, a processor-based system, and/or a consumer electronic device. As shown in FIG. 1, the compiler computing device 102 includes a processor 120, an input/output subsystem 122, a memory 124, a data storage device 126, and communication circuitry 128. Of course, the compiler computing device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in one or more processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or nonvolatile memory or data storage capable of performing the functions described herein. In operation, the memory 124 may store various data and software used during operation of the compiler computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the compiler computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the compiler computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store, for example, program source code and/or executable code for one or more target computing devices 104.

The communication circuitry 128 of the compiler computing device 102 may be embodied as any communication circuit, device, or collection thereof, capable of enabling communications between the compiler computing device 102, the target computing device 104, and/or other remote devices. The communication circuitry 128 may be configured to use any one or more communication technology (e.g., wired or wireless communications) and associated protocols (e.g., serial communications, USB, Ethernet, Bluetooth®, WiMAX, etc.) to effect such communication.

In some embodiments, the compiler computing device 102 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

The target computing device 104 is configured to execute executable program code produced by the compiler computing device 102 as described further below. The target computing device 104 may be embodied as any type of computation or computer device capable of performing the functions described herein, including, without limitation, an embedded computing device, an embedded controller, a sensing device, a microcontroller, a computer, a distributed computing system, a processor-based system, and/or a consumer electronic device. Thus, the target computing device 104 includes components and devices commonly found in a microcontroller or similar computing device, such as a processor 140, an I/O subsystem 142, a memory 144, a data storage device 150, and/or communication circuitry 152. Those individual components of the target computing device 104 may be similar to the corresponding components of the compiler computing device 102, the description of which is applicable to the corresponding components of the target computing device 104 and is not repeated herein so as not to obscure the present disclosure.

The memory 144 of the target computing device 104 further includes volatile memory 146 and non-volatile memory 148. The volatile memory 146 may be embodied as traditional RAM, meaning that any data contained in the volatile memory 146 is lost when power is removed from the target computing device 104 and/or the volatile-memory 146. The non-volatile memory 148 may be embodied as any embedded non-volatile memory, such as ferroelectric RAM. The non-volatile memory 148 may be accessed using ordinary, fine-grained load/store processor instructions. The non-volatile memory 148 provides non-volatility similar to flash memory, meaning that data is retained when power to the non-volatile memory 148 is lost. Additionally, compared to flash memory, the non-volatile memory 148 may provide byte-addressable, faster, lower-power, and finer-grained writes, and lower write endurance. In many embodiments, the non-volatile memory 148 may have a larger capacity than the volatile memory 146. For example, in an illustrative embodiment the non-volatile memory 148 may have a capacity of 64 kilobytes (kB) and the volatile memory 146 may have a capacity of 2 kB.

In some embodiments, one or more components of the target computing device 104, such as the processor 140, the I/O subsystem 142, and/or the memory 144, may form a portion of a microcontroller or a system-on-a-chip (SoC) and be incorporated on a single integrated circuit chip. For example, the target computing device 104 may include a low-power microcontroller with embedded non-volatile memory 148, such as one of the MSP430 series of microcontrollers made by Texas Instruments.

The target computing device 104 further includes or is otherwise coupled with an energy harvesting unit 154. The energy harvesting unit 154 recovers energy from the environment of the target computing device 104, providing energy to allow the target computing device 104 to execute programs. The energy harvesting unit 154 may harvest energy from, for example, solar energy, mechanical vibration, and/or radio frequency (RF) signals. In many embodiments, the energy harvesting unit 154 may provide energy in an unpredictable, bursty, and/or highly intermittent fashion.

The compiler computing device 102 and the target computing device 104 may be configured to transmit and receive data with each other and/or other devices of the system 100 through a direct connection or over a network (not shown). The network may be embodied as any number of various wired and/or wireless networks. For example, the network may be embodied as, or otherwise include, a wired or wireless local area network (LAN), a wired or wireless wide area network (WAN), a cellular network, and/or a publicly-accessible, global network such as the Internet. As such, the network may include any number of additional devices, such as additional computers, routers, and switches, to facilitate communications among the devices of the system 100.

Additionally, although the illustrative system 100 includes both a compiler computing device 102 and a target computing device 104, it should be understood that in some embodiments, the system 100 may include different numbers or arrangements of devices. For example, in some embodiments, the system 100 may include two or more target computing devices 104. As another example, in some embodiments, some or all of the functions of the compiler computing device 102 and the target computing device 104 may be combined into a single device.

Figure 2:
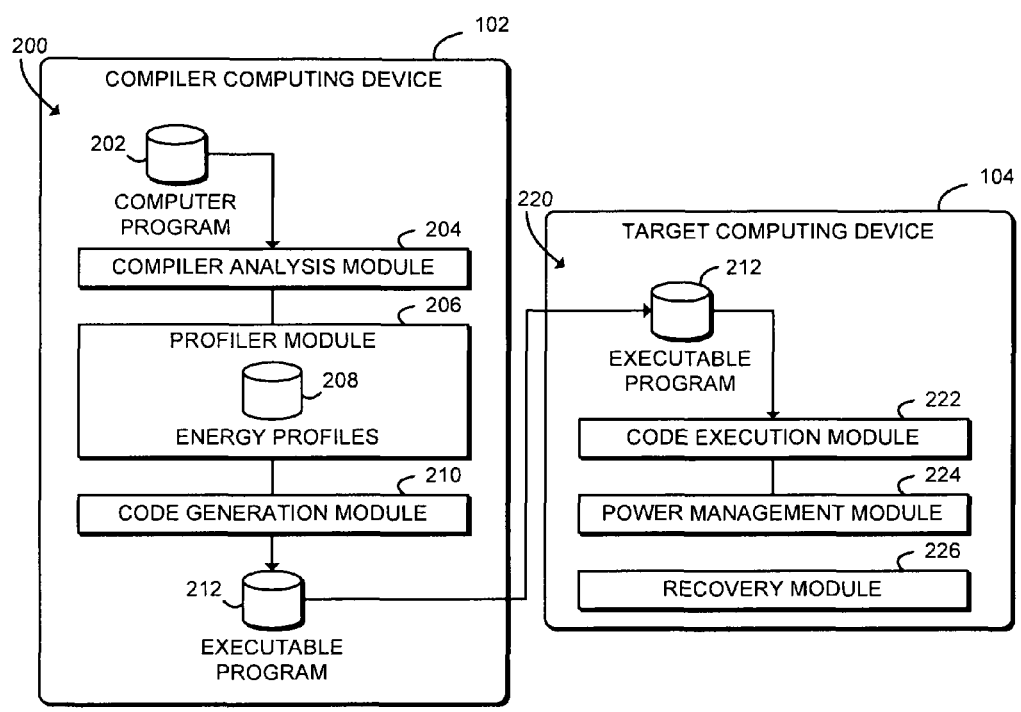
FIG. 2 is a simplified block diagram of at least one embodiment of various environments of the system of FIG. 1.

Referring now to FIG. 2, in an illustrative embodiment, the compiler computing device 102 establishes an environment 200 during operation. The illustrative environment 200 includes a computer program 202, a compiler analysis module 204, a profiler module 206, a code generation module 210, and an executable program 212. The various modules of the environment 200 may be embodied as hardware, firmware, software, or a combination thereof. As such, in some embodiments, one or more of the modules of the environment 200 may be embodied as circuitry or collection of electrical devices (e.g., compiler analysis circuitry 204, profiler circuitry 206, and/or code generation circuitry 210). It should be appreciated that, in such embodiments, one or more of the compiler analysis circuitry 204, the profiler circuitry 206, and/or the code generation circuitry 210 may form a portion of one or more of the processor 120, the I/O subsystem 122, and/or other components of the compiler computing device 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 120 or other components of the compiler computing device 102.

The compiler analysis module 204, which may be embodied as hardware, firmware, software, virtualized hardware, emulated architecture, and/or a combination thereof as discussed above, is configured to convert a computer program 202 into a sequence of atomic transactions and coalesce the sequence of atomic transactions to generate one or more additional sequences of transactions. Each of the sequences of transactions has an associated granularity, which may vary from fine to coarse. The computer program 202 may be embodied as any source code, intermediate code, or other computer program that may be compiled or otherwise prepared for execution by the target computing device 104.

The profiler module 206, which may be embodied as hardware, firmware, software, virtualized hardware, emulated architecture, and/or a combination thereof as discussed above, is configured to collect an energy profile 208 in relation to the target computing device 104 for each sequence of transactions associated with the computer program 202. The energy profile 208 is indicative of energy consumed by the target computing device 104 to execute a transaction of the corresponding sequence of transactions.

The profiler module 206 may be further configured to collect an available energy profile 208 in relation to the target computing device 104.

The code generation module 210, which may be embodied as hardware, firmware, software, virtualized hardware, emulated architecture, and/or a combination thereof as discussed above, is configured to generate an executable program 212 for the target computing device 104. The executable program 212 includes two or more sequences transactions. When executed, the executable program 212 selects between the sequences of transactions based on energy available to the target computing device 104. The code generation module 210 may be configured to select the sequences of transactions to include in the executable program 212 based on the energy profiles 208, including energy required to execute the transaction and/or energy available to the target computing device 104.

Still referring to FIG. 2, in an illustrative embodiment, a target computing device 104 establishes an environment 220 during operation. The illustrative environment 220 includes the executable program 212, a code execution module 222, a power management module 224, and a recovery module 226. The various modules of the environment 220 may be embodied as hardware, firmware, software, or a combination thereof. As such, in some embodiments, one or more of the modules of the environment 220 may be embodied as circuitry or collection of electrical devices (e.g., code execution circuitry 222, power management circuitry 224, and/or recovery circuitry 226). It should be appreciated that, in such embodiments, one or more of the code execution circuitry 222, the power management circuitry 224, and/or the recovery circuitry 226 may form a portion of one or more of the processor 140, the I/O subsystem 142, and/or other components of the target computing device 104. Additionally, in some embodiments, one or more of the illustrative modules may form a portion of another module and/or one or more of the illustrative modules may be independent of one another. Further, in some embodiments, one or more of the modules of the environment 220 may be embodied as virtualized hardware components or emulated architecture, which may be established and maintained by the processor 140 or other components of the target computing device 104.

The code execution module 222, which may be embodied as hardware, firmware, software, virtualized hardware, emulated architecture, and/or a combination thereof as discussed above, is configured to select an active sequence of transactions from the executable program 212 based on a granularity of the active sequence of transactions and a confidence value. As described above, the executable program 212 includes multiple sequences of transactions, and each sequence of transactions has a different granularity. The code execution module 222 is further configured to execute the transactions of the active sequence of transactions in response to selecting the active sequence of transactions.

The power management module 224, which may be embodied as hardware, firmware, software, virtualized hardware, emulated architecture, and/or a combination thereof as discussed above, is configured to initialize the confidence level to a minimum value. The confidence level is indicative of available energy produced by the energy harvesting unit 154 of the target computing device 104. The power management module 224 is further configured to attempt to commit the transaction of the active sequence of transactions, determine whether the transaction has successfully committed, and increase the confidence level in response to determining that the transaction has successfully committed.

The recovery module 226, which may be embodied as hardware, firmware, software, virtualized hardware, emulated architecture, and/or a combination thereof as discussed above, is configured to recover execution of the executable program 212 in response to determining that the transaction of the active sequence of transactions has not successfully committed. For example, the recovery module 226 may be configured to recover execution in response to a power failure or other interruption while executing the transaction or attempting to commit the transaction. Recovering execution of the executable program 212 may include resetting the confidence value to the minimum value and then restarting the selection of the active sequence of transactions. In some embodiments, recovering execution of the executable program 212 may include resetting the confidence value and then restarting an attempt to commit the transaction.

Figure 3:
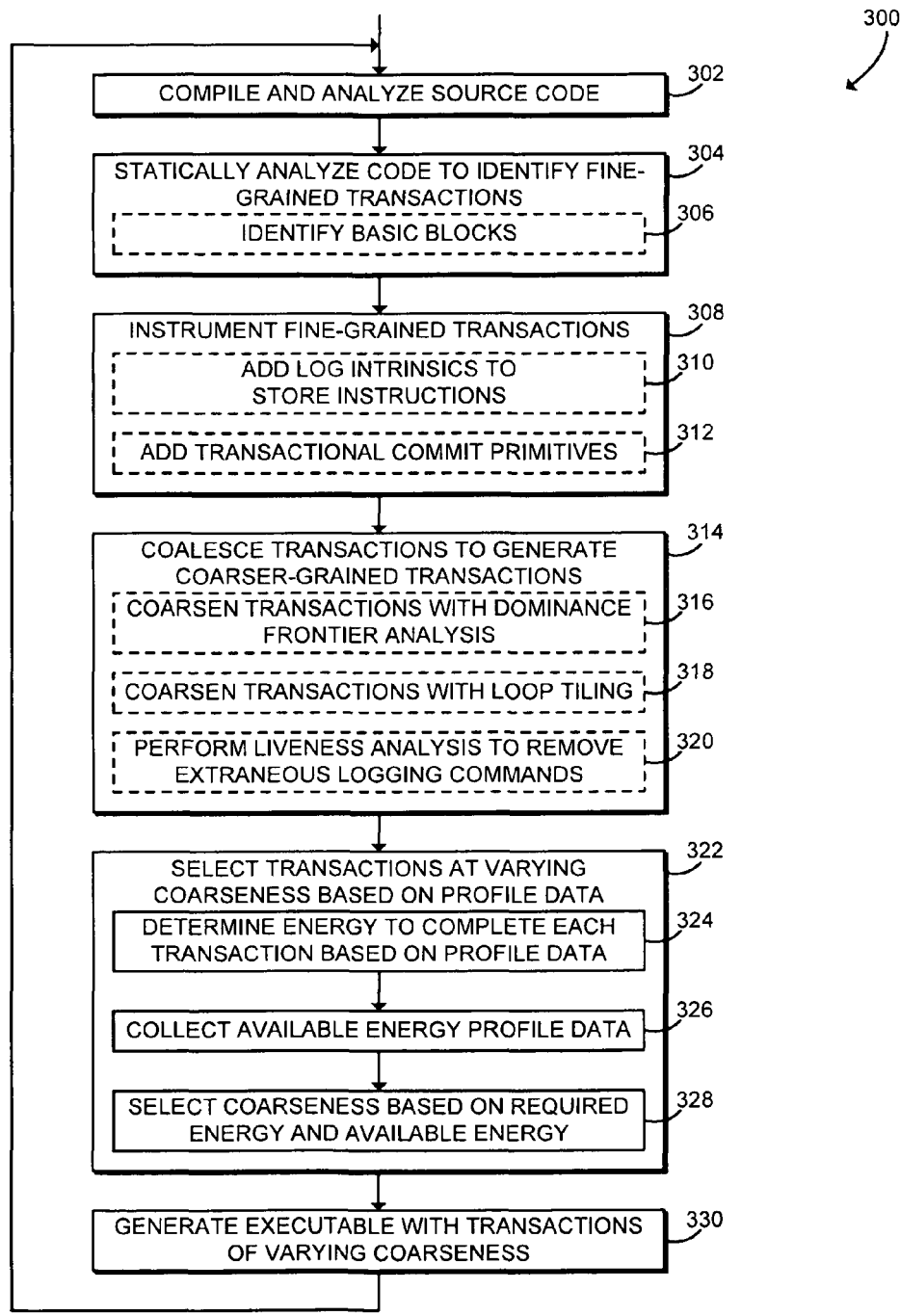
FIG. 3 is a simplified flow diagram of at least one embodiment of a method for multi-versioned code compilation that may be executed by a computing device of the system of FIGS. 1-2.

Referring now to FIG. 3, in use, the compiler computing device 102 may execute a method 300 for multi-versioned code compilation. The method 300 begins with block 302, in which the compiler computing device 102 compiles and analyzes source code of the computer program 202 (for example, C code, C++ code, or other source code). The compiler computing device 102 may, for example, parse the computer program 202 and generate an in-memory representation of the computer program 202 that may be analyzed and modified by the compiler computing device 102. For example, the compiler computing device 102 may generate an abstract syntax tree ("AST"), a control flow graph, or an intermediate representation of the computer program 202. The intermediate representation may be embodied as a graph structure connecting basic blocks of the computer program 202.

In block 304, the compiler computing device 102 statically analyzes the code of the computer program 202 to identify fine-grained transactions within the computer program 202. Thus, the compiler computing device 102 divides the computer program 202 into a sequence of atomic transactions. Each of the fine-grained transactions may include a small number of machine instructions or other operations, allowing the target computing device 104 to make forward progress when available power is intermittent. For example, in some embodiments, each fine-grained transaction may include four to five machine instructions. The compiler computing device 102 may use any technique to identify the fine-grained transactions. In some embodiments, in block 306 the compiler computing device 102 may identify the basic blocks of the computer program 202. Each fine-grained transaction may include a single basic block.

In block 308, the compiler computing device 102 instruments the fine-grained transactions of the computer program 202 that were previously identified. Instrumenting the fine-grained transactions allows the target computing device 104 to undo changes made by the transaction if the transaction fails to commit, for example as a result of a power failure during execution of the transaction. The instrumented transactions may store old values for non-volatile memory 148 data, which may be used to roll back changes to the non-volatile memory 148 in response to a power failure. Similarly, the instrumented transactions may store new values for volatile memory 146 that are made persistent when the transaction is committed. Instrumenting the fine-grained transactions thus allows the target computing device 104 to restore a consistent state after a power failure.

In some embodiments, in block 310, the compiler computing device 102 may add logging primitives to store instructions in the fine-grained transactions. For stores to non-volatile memory 148 locations, an nvLog intrinsic may be inserted before the store to log the old value into a non-volatile memory log that is stored in the non-volatile memory 148. This ensures that changes to non-volatile memory 148 can be undone (i.e., rolled back) if a power failure occurs during execution of the transaction. As described further below, if the transaction successfully commits, this logged data may be discarded. For updates to the volatile memory 146, a voLog intrinsic may be inserted after the store instruction to record the new value into a volatile memory log that is also stored in the non-volatile memory 148. Thus, the volatile memory log may store values for volatile data including volatile variables, registers, stack, and other non-persistent global variables. The volatile memory log may be used to redo (i.e., roll forward) changes to the volatile memory 146 if a power failure occurs during execution and/or commit of the transaction.

In some embodiments, in block 312, the compiler computing device 102 may add transactional commit primitives to each of the fine-grained transactions. For example, the compiler computing device 102 may insert a call to a commit function at the end of each fine-grained transaction. Committing the transaction makes changes to volatile memory 146 variables persistent by writing the changes to a shadow copy of the volatile data 146 that is stored in the non-volatile memory 148. For example, committing the transaction may copy values from the volatile memory log to the shadow copy of the volatile data 146. Thus, updates to the volatile memory 146 from committed transactions will survive restarts and power failures. As described further below, in some embodiments the commit function may be restarted in the event of a power failure while attempting to commit the transaction.

In block 314, the compiler computing device 102 coalesces the transactions of the computer program 202 to generate coarser-grained transactions. In other words, the compiler computing device 102 may combine two or more of the fine-grained transactions to generate a new sequence of transactions having a coarser granularity. As described further below, fine-grained transactions may be deployed when energy is scarce for the target computing device 104. Smaller transactions may incur higher overall overhead but prevent the risk of live-lock and guarantee forward progress in energy-limited scenarios. On the other hand, coarser-grained transactions, formed by merging smaller neighboring transactions, may be deployed when energy is abundant for the target computing device 104. The compiler computing device 102 may generate transactions at multiple levels of coarseness. For example, in some embodiments the compiler computing device 102 may generate medium-grained transactions including about 50 machine instructions each as well as coarse-grained transactions including about 200 machine instructions each. The compiler computing device 102 may use any technique to coalesce the transactions, including combining neighboring transactions in an ad hoc manner.

In some embodiments, in block 316 the compiler computing device 102 may coarsen the transactions using a dominance frontiers analysis. Dominance frontiers were first introduced by Ron Cytron et al., "Efficiently Computing Static Single Assignment Form and the Control Dependence Graph," TOPLAS (1991). A control flow graph (CFG) is a graph whose nodes represent program statements and whose directed edges represent control flow. A node X of a control flow graph strictly dominates a node Y in the control flow graph if it is impossible to reach Y without passing through X first. A node Z is in the dominance frontier of a node X if X does not strictly dominate Z, but X does dominate some immediate predecessor of Z. To form a coarser transaction region, the compiler computing device 102 may select a basic block X seed and expand the coarser transaction region to all nodes or basic blocks of the control flow graph that are dominated by X. Calls to a commit function or other transactional commit primitives may be inserted at the dominance frontiers of X.

In some embodiments, in block 318 the compiler computing device 102 may coarsen the transactions by performing loop tiling. Loop tiling is a commonly used compiler transformation that partitions a loop's iteration space into smaller chunks or blocks, often to improve data locality. The compiler computing device 102 may form a coarser-grained transaction out of a tiled loop structure, effectively combining multiple iterations of a loop into a single transaction.

In some embodiments, in block 320 the compiler computing device 102 may perform a liveness analysis of the coarsened transactions to remove redundant logging commands. A variable v is live on a CFG edge if: (1) there exists a directed path from that edge to a use of v, and (2) that path does not go through any definition of v. After performing the liveness analysis, logging commands and/or other instrumentations may be removed from store operations relating to variables that are not live in the coarsened transaction. Thus, the compiler computing device 102 may reduce transactional overhead for the coarsened transactions.

In block 322, the compiler computing device 102 selects multiple sequences of transactions at varying levels of coarseness based on energy profile data 208. In block 324, the compiler computing device 102 determines the energy required to complete each transaction based on the energy profile data 208. As described above, the compiler computing device 102 may generate many variants of the computer program 202 (i.e., many different sequences of atomic transactions for the computer program 202). Each variant includes transactions of a certain granularity. The compiler computing device 102 determines the energy requirements for the transactions of each variant. For example, each variant may be run on the target computing device 104 with a steady power supply (i.e., no intermittency) to determine the energy required to complete the transactions, the time required to complete the transactions, or other power/performance data. As another example, the power/performance data may be determined using a software simulator, an FPGA board with hardware specifications of the target computing device 104, or other simulation. For each level of granularity associated with the variants, this power/performance data may provide reasonably precise estimates of energy required to complete one transaction.

In block 326, the compiler computing device 102 collects profile data for energy available to the target computing device 104 in the deployment environment. Similar to the power/performance data, the available energy data may be based on data received from one or more target computing devices 104 in the deployment environment and/or on data determined through simulation.

In block 328, the compiler computing device 102 selects variants of the computer program 202 having appropriate coarseness based on the profile data indicating the energy required to complete the transactions and the available energy in the deployment environment. For example, based on the available energy and the performance constraints of the application, the compiler computing device 102 may determine whether transactions of a particular level of coarseness are likely to be successfully completed. The compiler computing device 102 may select a relatively small number of variants at different levels of coarseness, for example selecting a fine-grained variant, a medium-grained variant, and a coarse-grained variant.

In block 330, the compiler computing device 102 generates the executable program 212 including the selected sequences of transactions having varying levels of coarseness. Thus, the executable program 212 is a multi-versioned executable including two or more sequences of atomic transactions, each having transactions with a different level of granularity. As described below, the executable program 212 may also include runtime code to select among the available levels of coarseness at runtime based on the energy available to the target computing device 104. After generating the executable program 212, the method 300 loops back to block 302 to continue compiling program code.

Figure 4:
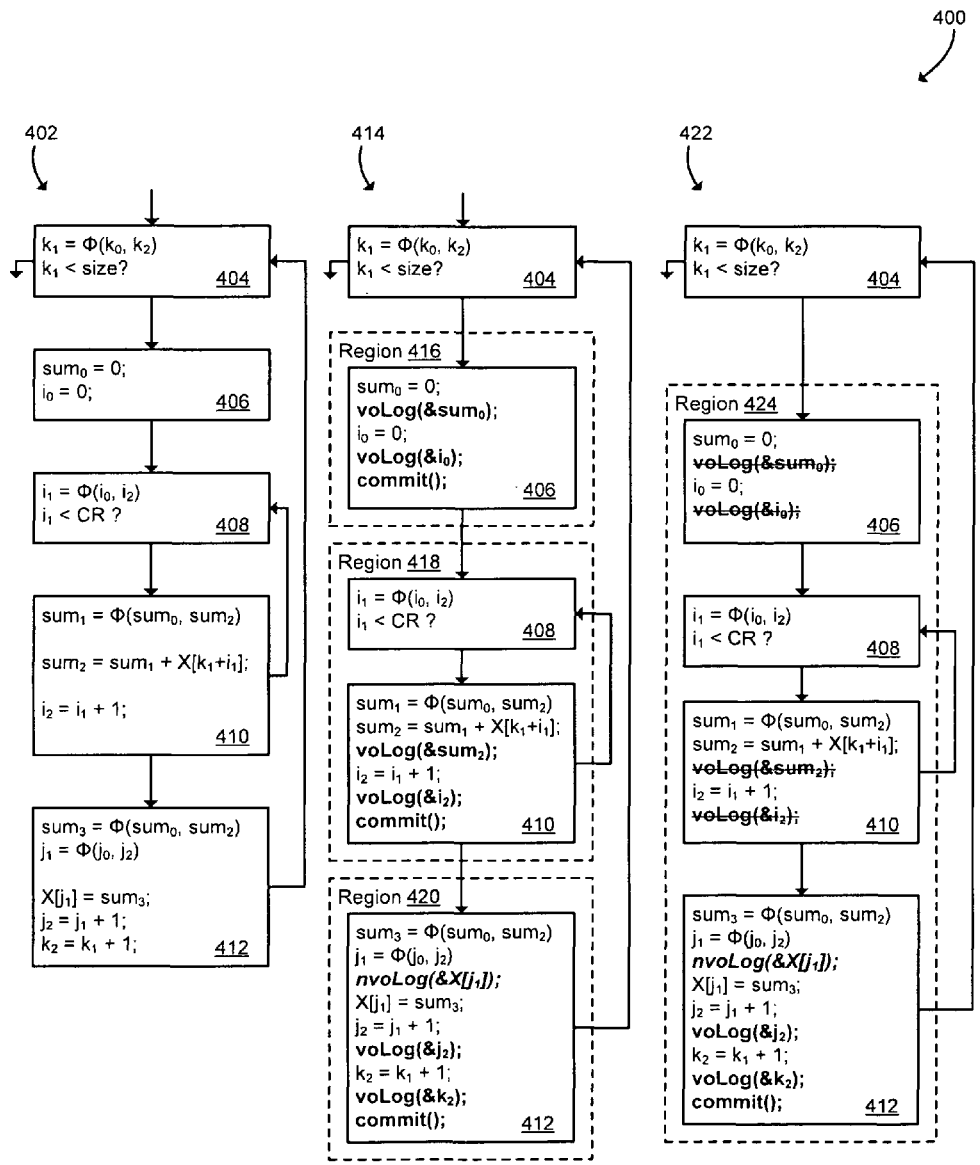
FIG. 4 is a simplified block diagram illustrating transaction region coalescing that may be performed by the system of FIGS. 1-2.

Referring now to FIG. 4, schematic diagram 400 illustrates various control flow graphs that may be generated by the compiler computing device 102. Graph 402 illustrates a control flow graph for a computer program 202 (or part of a computer program) that has not been divided into atomic transactions. As shown, the control flow graph 402 includes five basic blocks 404, 406, 408, 410, 412.

Graph 414 illustrates the graph 402 after the fine-grained transactions have been identified and instrumented. As shown, changes to volatile variables have been instrumented by inserting calls to the voLog function following each volatile variable update, and changes to non-volatile variables have been instrumented by inserting calls to the nvoLog function before each non-volatile variable update. The basic blocks 406, 410, 412 (which include updates to volatile and/or non-volatile variables) have also been instrumented by inserting calls to the commit function. Thus, based on the inserted commit function calls, the control flow graph 414 includes an atomic region 416 that includes the basic block 406, an atomic region 418 that includes the basic blocks 408, 410, and an atomic region 420 that includes the basic block 412.

Graph 422 illustrates the graph 414 after coarsening the transactions using dominance frontier analysis. As shown in the graph 414, the basic block 406 dominates the basic blocks 408, 410, 412. Thus, those basic blocks 406, 408, 410, 412 may be combined to form a coarser-grained region 424 of the graph 422. As shown, the region 424 includes a call to the commit function inserted at the end of the basic block 412, which in the illustrative example is equivalent to the dominance frontier of the basic block 406. The graph 422 additionally illustrates optimization by removing redundant logging commands. As shown, the variables sum and i are redefined at the beginning of the coarsened transaction region 424. Because those variables are not live in the region 424, the calls to voLog for those variables may be removed.

Referring now to FIGS. 5A and 5B, pseudocode diagram 500 illustrates instrumented code at varying levels of granularity that may be generated by the compiler computing device 102. Pseudocode 502 illustrates instrumented code with fine-grained transactions. As shown, calls to the voLog have been inserted following each volatile variable update and calls to the nvoLog function have been inserted before each non-volatile variable update. Additionally, three calls to commit_X functions have been inserted at the end of each fine-grained transaction. Pseudocode 504 illustrates the pseudocode 502 after neighboring basic blocks have been coalesced into a coarser-grained transaction. As shown, the pseudocode 504 includes a single call to the commit_3 function at the end of the coarser-grained transaction. Thus, each coarser-grained transaction includes one iteration of the outer loop. Pseudocode 506, shown in FIG. 5B, illustrates the pseudocode 504 after a liveness analysis has been performed to remove unnecessary logging calls. As shown, the calls to voLog for the variables sum and i have been removed. Psuedocode 508 illustrates coarse-grained transactions after loop tiling. As shown, the pseudocode 508 includes a call to the commit_4 function after each tiled iteration of the loop. Thus, each coarse-grained transaction of the pseudocode 508 includes multiple iterations of the outer loop.

Figure 6:
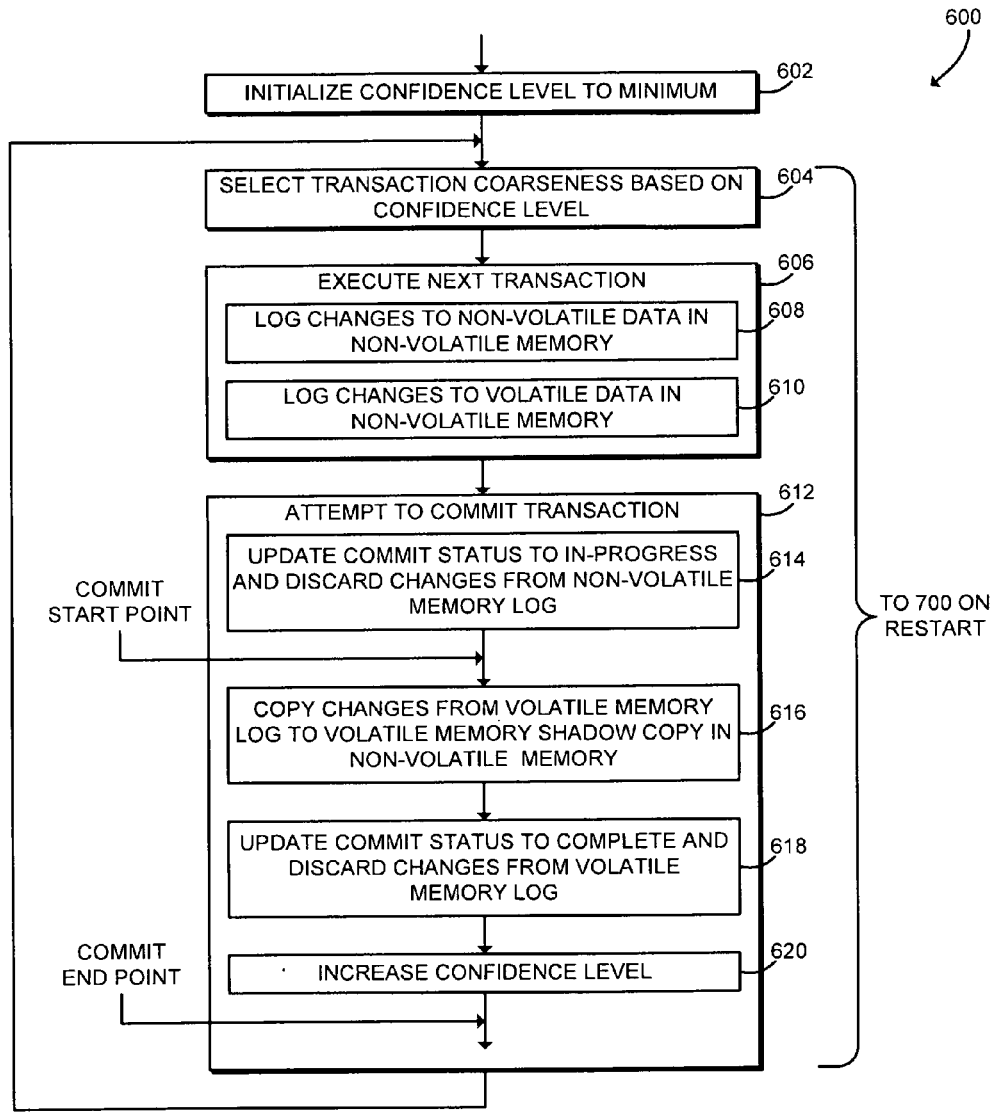
FIG. 6 is a simplified flow diagram of at least one embodiment of a method for executing multi-versioned code that may be executed by a target computing device of the system of FIGS. 1-2.

Referring now to FIG. 6, in use, a target computing device 104 may execute a method 600 for multi-versioned code execution. The method 600 begins with block 602, in which the target computing device 104 initializes a confidence level to a minimum value, such as zero. The confidence level is indicative of the energy available to the target computing device 104. As described below, the confidence level may be increased as transactions are successfully committed without power failures and may be reset when execution resumes after a power failure.

In block 604, the target computing device 104 selects a transaction coarseness level from the executable program 212 based on the current confidence level. As described above, the executable program 212 includes multiple variants, each of which includes a series of transactions of varying levels of granularity. The target computing device 104 may select finer-grained transactions for low confidence levels and coarser-grained transactions for higher confidence levels. Thus, during runtime—at specific locations in the executable program 212—execution of the executable program 212 may migrate from finer-grain transactions to more coarse-grained transactions if enough confidence is built. For example, when a certain number of smaller transactions have been committed successfully back-to-back without any power disruption, the target computing device 104 may select and execute coarser-grained transactions. As another example, when the confidence level is reset due to power failure, execution may resume with finer-grained transactions. As a result, the executable program 212 has different modes of operation, each with its own energy consumption and performance profile. Therefore, at runtime, execution of the executable program 212 may morph among the different variants to adjust to the energy harvesting profile of the deployment environment while achieving maximum performance that can be supported.

In block 606, the target computing device 104 executes the next transaction from the selected variant of the executable program 212. During execution of the transaction, the target computing device 104 logs changes to the memory 144 in the non-volatile memory 148. As described further below in connection with FIG. 7, if execution of the transaction is interrupted—for example, due to a power failure—on restart, the changes to the memory 144 may be rolled back and execution of the transaction may be resumed. In block 608, during execution of the transaction, the target computing device 104 logs changes to non-volatile data in a non-volatile memory log that is stored in the non-volatile memory 148. For example, the target computing device 104 may execute nvoLog intrinsics that were added to the executable program 212 by the compiler computing device 102, as described above. In block 610, during execution of the transaction, the target computing device 104 logs changes to volatile data in a volatile memory log that is also stored in the non-volatile memory 148. For example, the target computing device 104 may execute voLog intrinsics that were added to the executable program 212 by the compiler computing device 102, as described above.

In block 612, the target computing device 104 attempts to commit the transaction. The target computing device 104 may attempt to commit the transaction, for example, in response to a call to a commit_X function added to the executable program 212 by the compiler computing device 102, as described above. When committing the transaction, updates to non-volatile data have already been consistently written back to non-volatile memory 148. New values for volatile data 146 are also recorded in the volatile memory log, which is stored in the non-volatile memory 148. To complete the transaction, the target computing device 104 makes the contents of the volatile memory 146 persistent, for example by copying the contents of the volatile memory log into a volatile memory shadow copy that is also stored in the non-volatile memory 148. The volatile memory shadow copy may include values for volatile variables, registers, stack, and other global volatile variables. The target computing device 104 commits the transactions safely so that the target computing device 104 may be restored to a consistent state in the event of a power failure during the commit. As described further below in connection with FIG. 7, if commit of the transaction is interrupted—for example, due to a power failure—on restart, the target computing device 104 may resume committing the transaction.

In block 614, the target computing device 104 updates a commit status flag to "in-progress" and discards changes from the non-volatile memory log. The status flag, as well as other bookkeeping flags, are stored in the non-volatile memory 148. As described further below in connection with FIG. 7, once the commit status flag has successfully been changed to "in-progress," then the target computing device 104 may resume the commit phase of the transaction after a power failure. The target computing device 104 may log the bookkeeping flags (including the commit status flag) to allow for recovery in the event of a power failure while updating the commit status.

In block 616, the target computing device 104 copies changes from the volatile memory log to the volatile memory shadow copy stored in the non-volatile memory 148. In the event of a power failure while copying to the volatile memory shadow copy, the target computing device 104 may restart the commit operation in block 616, as described further below.

In block 618, the target computing device 104 updates the commit status flag to "complete" and discards changes from the volatile memory log. Again, the target computing device 104 may log the bookkeeping flags to allow for recovery in the event of a power failure while updating the commit status. Updating the commit status may indicate that the transaction has successfully committed and all non-volatile updates have been made permanent. In block 620, the target computing device 104 increases the confidence level. For example, the target computing device 104 may increment the confidence level by a predetermined amount. After committing the transaction, the method 600 loops back to block 604 to continue selecting the transaction coarseness and executing the next transaction.

Figure 7:
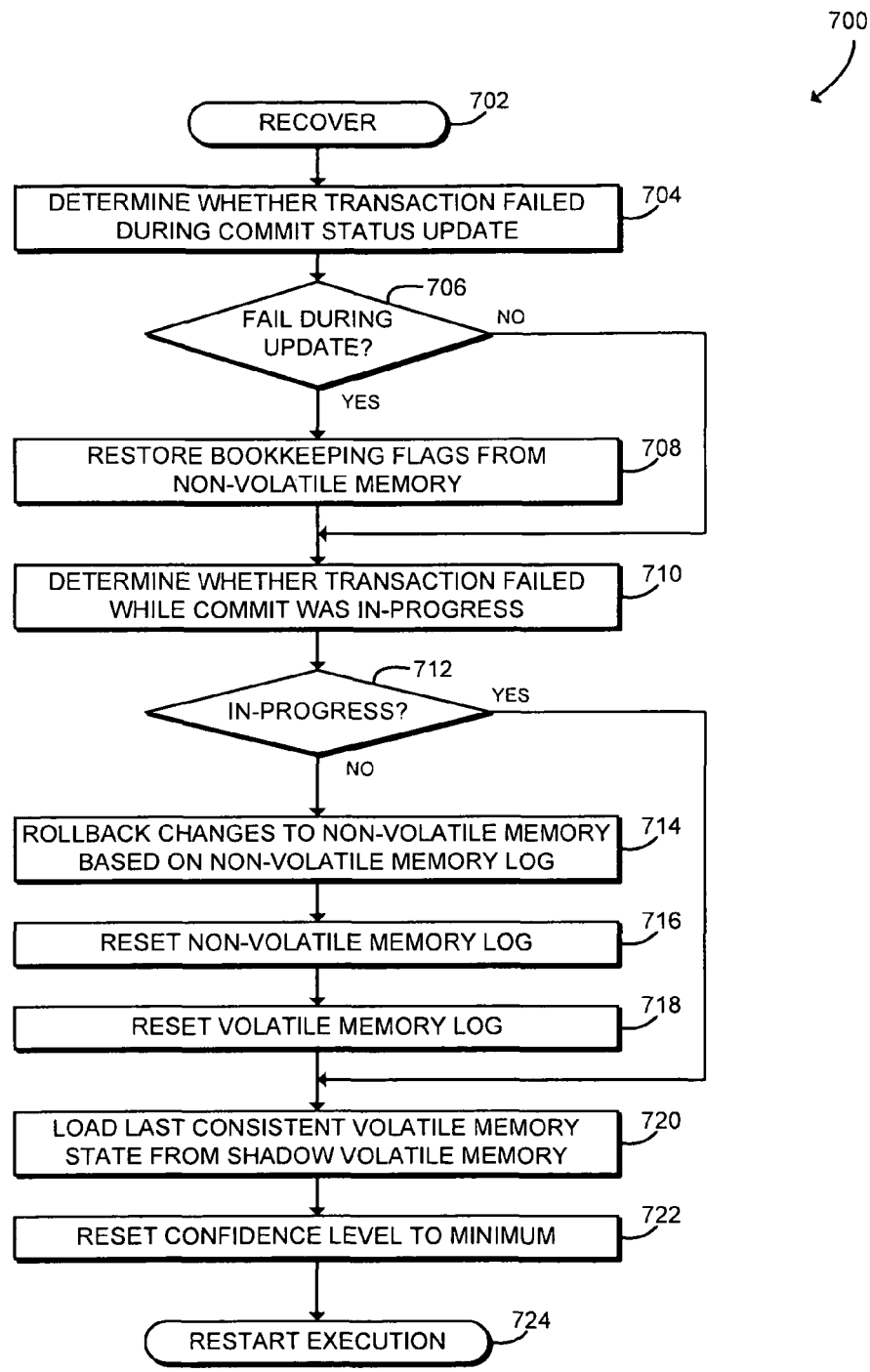
FIG. 7 is a simplified flow diagram of at least one embodiment of a method for recovery after power loss that may be executed by the target computing device of the system of FIGS. 1-2.

As described above, the power available to the target computing device 104 may be intermittent. Thus, the target computing device 104 may crash or otherwise stop executing the method 600 due to lack of power at any point. As shown, in the illustrative embodiment, if a power failure occurs at any point during execution of the blocks 604 through 620, upon a restart or when power is otherwise again available to the target computing device 104, the target computing device 104 starts to execute a recovery method, which is illustrated in FIG. 7. Depending on when the power failure occurred, the recovery method may either resume executing the transaction (after rolling back changes to the non-volatile memory 148) or resume executing the commit phase of the transaction.

Referring now to FIG. 7, in use, the target computing device 104 may execute a method 700 for recovery after power loss. The method 700 begins with block 702, in which the target computing device 104 starts the recovery process after a power loss. For example, the target computing device 104 may start the recovery process whenever power becomes available from the energy harvesting unit 154. As described above, the target computing device 104 may begin the recovery process after the method 600 has been interrupted. The method 600 may have failed or otherwise been interrupted at any point while executing a transaction or while committing a transaction.

In block 704, the target computing device 104 determines whether execution of a transaction failed during a commit status update. For example, the target computing device 104 may determine whether execution failed during a status update as described above in connection with blocks 614 or 618 of FIG. 6. The target computing device 104 may determine whether execution failed during the commit status update by examining the contents of one or more bookkeeping flags stored in the non-volatile memory 148. In block 706, the target computing device 104 checks whether execution failed during the status update. If not, the method 700 branches ahead to block 710, described below. If execution failed during the status update, the method 700 advances to block 708.

In block 708, the target computing device 104 restores one or more bookkeeping flags, such as the commit status flag, from values stored in the non-volatile memory 148. The target computing device 104 restores the commit status flag and/or other bookkeeping flags to their values from before the failed attempt to update the commit status flag. For example, the target computing device 104 may restore the commit status flag and other bookkeeping flags from a mini-log stored in the non-volatile memory 148.

In block 710, the target computing device 104 determines whether execution of the transaction failed while a commit of the transaction was in-progress. For example, the target computing device 104 may determine whether execution failed while copying changes to the volatile memory shadow copy as described above in connection with block 616 of FIG. 6. The target computing device 104 may determine whether a commit of the transaction was in progress by examining the value of the commit status flag stored in the non-volatile memory 148. In block 712, the target computing device 104 checks whether a commit was in-progress. If so, the method 700 branches ahead to block 720, described below. If not, then the method 700 advances to block 714.

In block 714, the target computing device 104 rolls back changes to the non-volatile memory 148 based on the non-volatile memory log. As described above, the non-volatile memory log stores the previous values for non-volatile variables that were updated during a transaction. Thus, by rolling back the changes, the target computing device 104 discards any changes to the non-volatile memory 148 that were made by the transaction prior to execution being interrupted. The target computing device 104 may roll back the transaction by copying the previous values from the non-volatile memory log back to the appropriate location in the non-volatile memory 148.

In block 716, the target computing device 104 resets the non-volatile memory log, for example by clearing the log entries, resetting an index pointer, or otherwise emptying the non-volatile memory log. In block 718, the target computing device 104 resets the volatile memory log, for example by clearing the log entries, resetting an index pointer, or otherwise emptying the volatile memory log. As described above, the volatile memory log stores new values for volatile variables that were updated during the transaction. Thus, by resetting the volatile memory log, the target computing device 104 discards any changes made to volatile variables prior to the transaction being interrupted.

In block 720, the target computing device 104 loads the last consistent volatile memory state from the volatile memory shadow copy stored in the non-volatile memory 148 into the volatile memory 146. As described above, during a commit the contents of the volatile memory log are copied into the volatile memory shadow copy. Therefore, the volatile memory shadow copy may contain the contents of the volatile memory 146 at the time of the last successful commit. If the transaction execution was interrupted while copying values into the volatile memory shadow copy (i.e., interrupted while the commit was in-progress), then it is possible that the volatile memory shadow copy may not include all changes made to the volatile variables. However, in those circumstances, the volatile memory log stored in the non-volatile memory 148 stores the updated values of the volatile variables. Note that if execution was interrupted while a commit was in-progress, the method 700 does not execute block 718 and thus the volatile memory log is not reset. Thus, in those circumstances, upon resuming the commit phase of the transaction, the target computing device 104 may continue copying the contents of the volatile memory log to the volatile memory shadow copy.

In block 722, the target computing device 104 resets the confidence level. Resetting the confidence value indicates that the target computing device 104 has recovered from an interruption to execution and therefore indicates that available energy may be intermittent. In the illustrative embodiment, the target computing device 104 resets the confidence level to its minimum value, for example to zero. Additionally or alternatively, the target computing device 104 may reset the confidence value using different techniques, for example by decrementing the confidence value by a predefined amount. As described above in connection with FIG. 6, the target computing device 104 may select more fine-grained transactions for execution in response to resetting the confidence value.

In block 724, the target computing device 104 restarts execution of the transactions. Depending on when execution was interrupted, the target computing device 104 may restart execution of the previous transaction from its beginning, or the target computing device 104 may restart the commit phase of the previous transaction. For example, if execution was interrupted while a commit was in-progress, the target computing device 104 may restart execution of the method 600 at block 616, shown as the commit start point in FIG. 6. In that example, after restarting execution the target computing device 104 will continue to copy values from the volatile memory log to the volatile memory shadow copy. As another example, if execution was interrupted while a commit was not in-progress, the target computing device 104 may restart execution of the method 600 after block 620, shown as the commit end point in FIG. 6. In that example, after restarting execution the method 600 loops back to block 604 to select a transaction coarseness, which may result in selecting finer-grained transactions, and then the method 600 proceeds to block 606 to execute the transaction. Because the non-volatile memory 148 was rolled back, the target computing device 104 restarts the transaction that was previously interrupted. After restarting execution, the method 700 is completed. The method 700 may be executed again in response to future recoveries from power failure.

Figure 8:
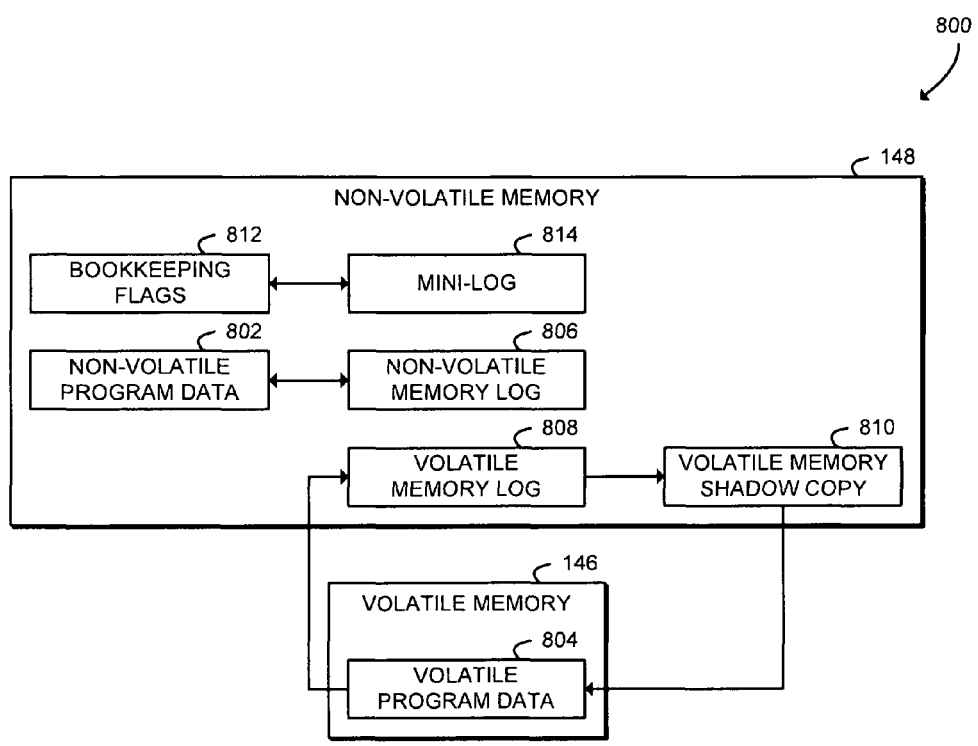
FIG. 8 is a simplified block diagram illustrating a memory model that may be maintained by the target computing device of the system of FIGS. 1-2.

Referring now to FIG. 8, a diagram 800 illustrates a potential embodiment of a memory model that may be maintained by the target computing device 104. As shown, the non-volatile memory 148 includes non-volatile program data 802. The non-volatile program data 802 may be embodied as variables, buffers, or other data accessed by the executable program 212 in the non-volatile memory 148. Similarly, the volatile memory 146 includes volatile program data 804, which may be embodied as volatile variables, registers, stack, or other volatile data accessed by the executable program 212 in the volatile memory 146. During execution of the transactions of the executable program 212, changes to the non-volatile program data 802 are logged in a non-volatile memory log 806, which is stored in the non-volatile memory 148. Similarly, during execution of the transactions of the executable program 212, changes to the volatile program data 804 are logged in a volatile memory log 808, which is also stored in the non-volatile memory 148. During a transactional commit, the updated values of the volatile program data 804 stored in the volatile memory log 808 are copied to the volatile memory shadow copy 810, which is stored in the non-volatile memory 148. Upon recovery from a power failure or other interruption of execution, the contents of the volatile memory shadow copy 810 may be restored to the volatile program data 804. As shown, the non-volatile memory 148 also includes one or more bookkeeping flags 812, which may be embodied as a commit status flag, a restart address, or other data to allow the target computing device 104 to recover from power failures or other interruptions. The contents of the bookkeeping flags 812 may be logged in a mini-log 814, which may be used to recover the contents of the bookkeeping flags 812 if a power failure or other interruption occurs while updating the bookkeeping flags 812.

Figure 9:
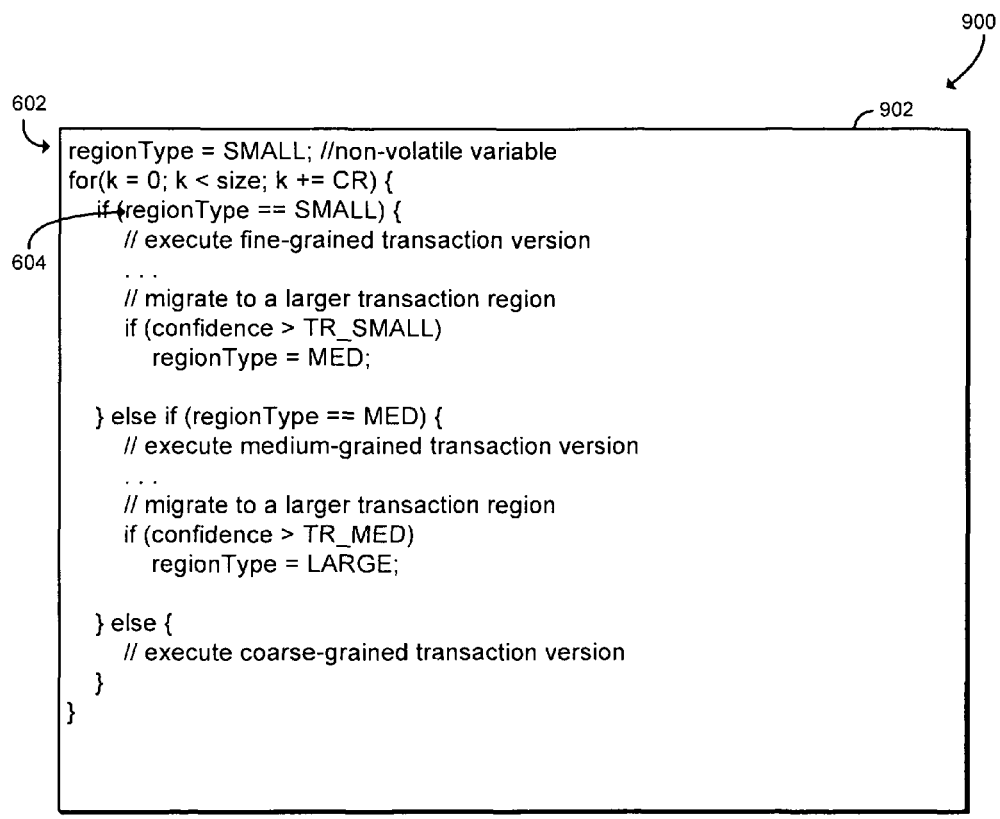
FIG. 9 is a pseudocode diagram illustrating a routine for executing multi-versioned code that may be executed by the target computing device of the system of FIGS. 1-2.

Referring now to FIG. 9, pseudocode 900 illustrates multi-versioned code capable of morphing among different transaction region sizes at runtime. In the illustrative embodiment, a regionType variable defaults to SMALL, which is its minimum value and which corresponds to block 602 of FIG. 6. The pseudocode 900 includes a branching conditional structure to select transactions based on the value of the regionType variable, which corresponds to the block 604 of FIG. 6. The example shown in pseudocode 900 includes three different variants of SMALL, MED, and LARGE granularity, respectively. As shown, the regionType variable may be modified if the confidence value exceeds certain predefined thresholds. As described further below, the confidence value is reset on recovery from a power failure. Therefore, at runtime execution may switch back and forth between these granularity variants based on scarcity or abundance of energy.

Figure 10:
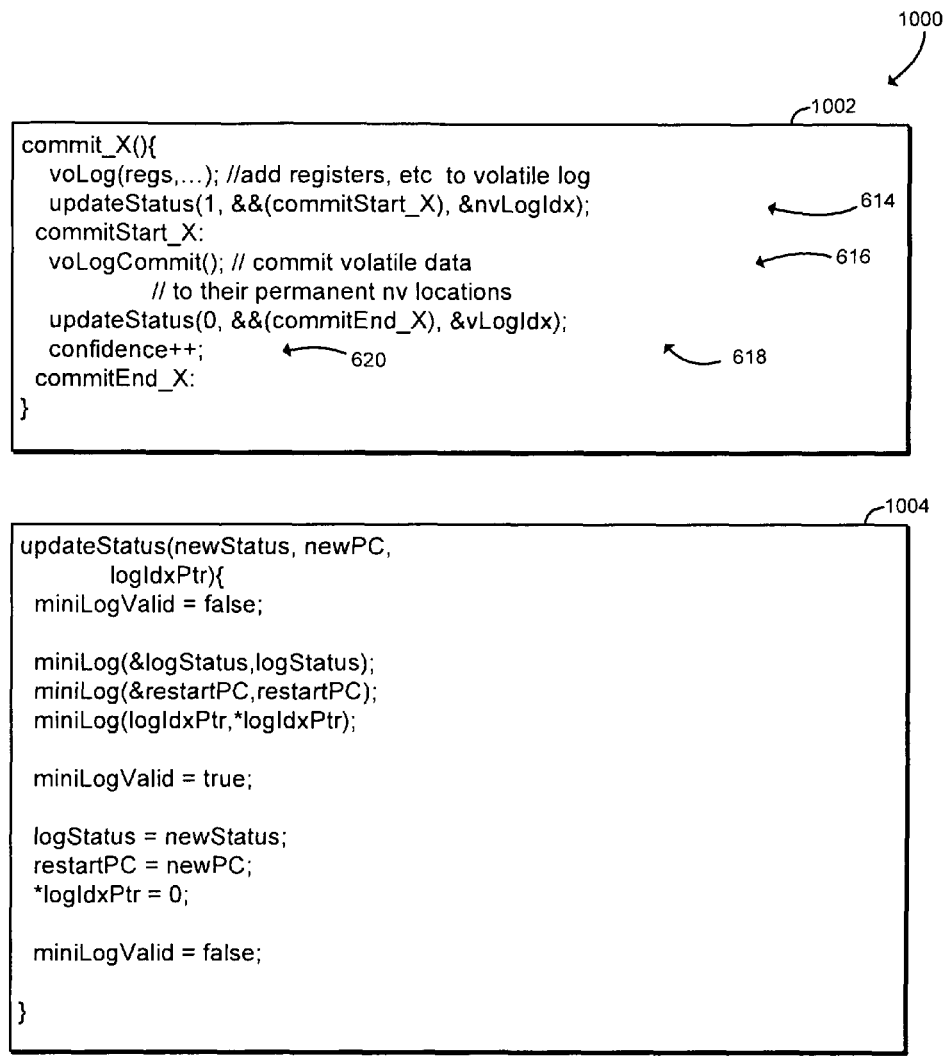
FIG. 10 is a pseudocode diagram illustrating routines for committing transactions that may be executed by the target computing device of the system of FIGS. 1-2.

Referring now to FIG. 10, pseudocode diagram 1000 shows illustrative procedures for committing a transaction. Pseudocode 1002 illustrates one potential embodiment of a commit function that may be executed by the target computing device 104. As shown, the commit_X function begins by calling the function updateStatus to update the commit status flag to "1" (corresponding to "in-progress"). Pseudocode 1004 illustrates one potential embodiment of the updateStatus function. As shown, the updateStatus function stores the values of certain bookkeeping flags (e.g., logStatus, restartPC, and logIdxPtr) in the mini-log prior to updating the bookkeeping flags. As described above, the values of the bookkeeping flags may be recovered if execution of the updateStatus function is interrupted, for example by a power failure. As shown, the call to the updateStatus function corresponds to block 614 of FIG. 6.

After updating the commit status flag to in-progress, the pseudocode 1002 calls a function voLogCommit, which copies values from the volatile memory log to the volatile memory shadow copy stored in the non-volatile memory 148. The call to voLogCommit corresponds to block 616 of FIG. 6. After successfully copying the volatile memory value to the volatile memory shadow copy, the pseudocode 1002 calls the function updateStatus to update the commit status flag to "0" (corresponding to "complete" or to "not in-progress"). The call to update the status to complete corresponds to block 618 of FIG. 6. After successfully updating the commit status flag, the pseudocode 1002 increments the confidence variable, which corresponds to block 620 of FIG. 6. As described above, after incrementing the confidence variable, the commit function is complete and the target computing device 104 may continue executing transactions.

Figure 11:
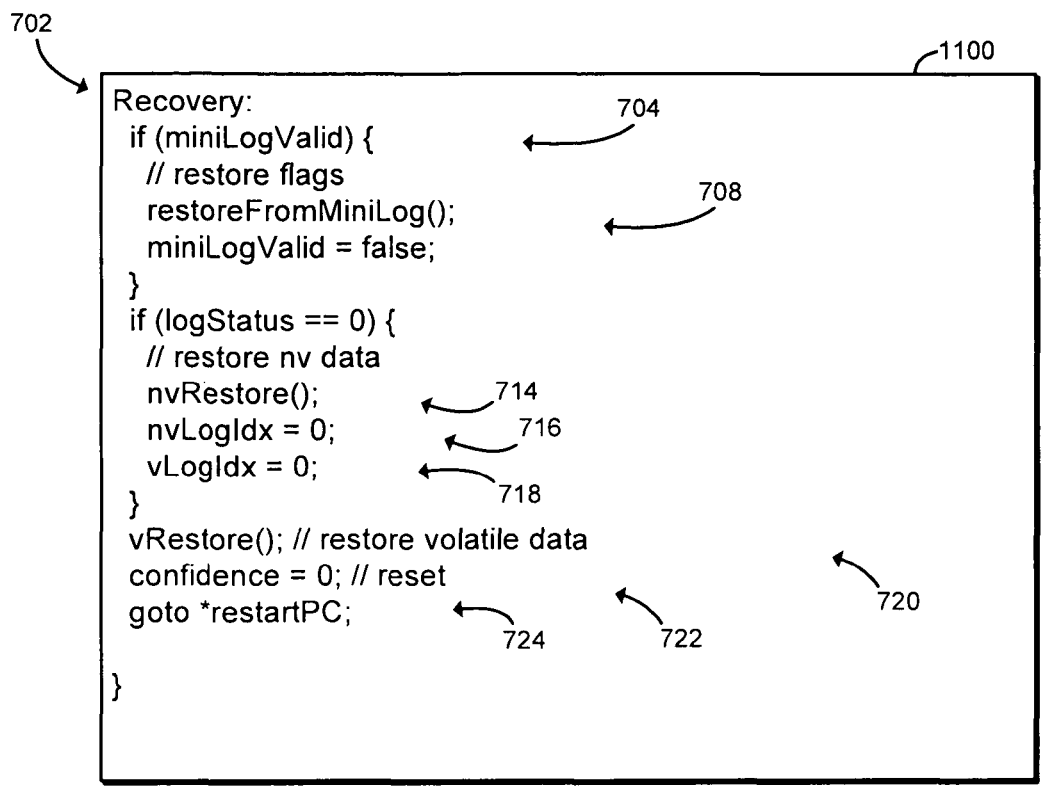
FIG. 11 is a pseudocode diagram illustrating a routine for recovery after power loss that may be executed by the target computing device of the system of FIGS. 1-2.

Referring now to FIG. 11, pseudocode 1100 illustrates one potential embodiment of a recovery process that may be executed by the target computing device 104. The pseudocode 1100 starts with the Recovery label, which corresponds to block 702 of FIG. 7. The Recovery label may be executed by the target computing device 104 when recovering from a power failure or other interruption of execution, for example as a boot vector or other routine called by the target computing device 104 when power is restored. The pseudocode 1100 determines whether execution was interrupted during a commit status update, corresponding to block 704 of FIG. 7, by checking the non-volatile bookkeeping flag miniLogValid. As shown in pseudocode 1004 of FIG. 10, the flag miniLogValid is true when the target computing device 104 has logged the bookkeeping values in the mini-log and is currently updating the bookkeeping flags. If the flag is true (i.e., if the status update was interrupted), then the pseudocode 1100 calls the restoreFromMiniLog function, corresponding to block 708 of FIG. 7.

Next, the pseudocode 1100 determines whether execution was interrupted while a commit was in-progress, corresponding to block 710 of FIG. 7, by checking the non-volatile bookkeeping flag logStatus. If logStatus is equal to zero (i.e., not in-progress), then the pseudocode 1100 calls the nvRestore function, resets the nvLogIdx value, and resets the vLogIdx value, corresponding to blocks 714, 716, 718 of FIG. 7, respectively. Thus, if the logStatus is zero, the pseudocode 1100 rolls back any changes made by the executing transaction prior to crashing.

Next, the pseudocode 1100 calls the vRestore function to restore volatile program data from the volatile memory shadow copy, corresponding to block 720 of FIG. 7. After being restored, the volatile memory 146 is consistent with the state of the volatile memory 146 after the last successful transactional commit. After restoring the volatile memory 146, the pseudocode 1100 resets the confidence variable to zero, corresponding to block 722 of FIG. 7, and jumps to the address stored in the restartPC variable, corresponding to block 724 of FIG. 7. As shown in pseudocode 1004 of FIG. 10, if a commit was not in-progress, the restartPC variable stores the address of the commitEnd_X label, which corresponds resuming after block 620 of FIG. 6. If a commit was in-progress, the restartPC variable stores the address of the commitStart_X label, which corresponds to resuming before block 616 of FIG. 6. Thus, the pseudocode 1100 may restart execution of the transaction or restart a commit of the transaction, depending on whether execution was interrupted while a commit was in-progress.

It should be appreciated that, in some embodiments, the methods 300, 600, and/or 700 may be embodied as various instructions stored on a computer-readable media, which may be executed by the processors 120, 140, a peripheral device 130, and/or other components of the compiler computing device 102 and/or the target computing device 104 to cause the corresponding compiler computing device 102 and/or target computing device 104 to perform the corresponding method 300, 600, and/or 700. The computer-readable media may be embodied as any type of media capable of being read by the compiler computing device 102 and/or target computing device 104 including, but not limited to, the memory 124, 144, the data storage device 126, 150, a local memory of the processor 120, 140, other memory or data storage devices of the compiler computing device 102 and/or the target computing device 104, portable media readable by a peripheral device 130 of the compiler computing device 102, and/or other media.

EXAMPLES

Illustrative examples of the technologies disclosed herein are provided below. An embodiment of the technologies may include any one or more, and any combination of, the examples described below.

Example 1 includes a computing device for compiling code for a target device, the computing device comprising: a compiler analysis module to (i) convert a computer program into a first sequence of transactions and (ii) coalesce the first sequence of transactions to generate a second sequence of transactions, wherein the second sequence of transactions has a granularity that is more coarse than a granularity of the first sequence of transactions; and a code generation module to generate an executable program for the target device, wherein the executable program includes the first sequence of transactions and the second sequence of transactions, and wherein the executable program selects between the first sequence of transactions and the second sequence of transactions at runtime based on available energy.

Example 2 includes the subject matter of Example 1, and wherein to convert the computer program into the first sequence of transactions comprises to statically analyze the computer program to identify a sequence of basic blocks, wherein each transaction of the first sequence of transactions comprises a basic block.

Example 3 includes the subject matter of any of Examples 1 and 2, and wherein to convert the computer program into the first sequence of transactions comprises, for each basic block of the sequence of basic blocks, to: instrument each store operation of the corresponding basic block with a log operation; and add a transactional commit operation to the corresponding basic block.

Example 4 includes the subject matter of any of Examples 1-3, and wherein to coalesce the first sequence of transactions comprises to combine a first basic block of the first sequence of transactions with one or more basic blocks of the first sequence of transactions that are dominated by the first basic block to generate a coarser-grained transaction of the second sequence of transactions.

Example 5 includes the subject matter of any of Examples 1-4, and wherein to coalesce the first sequence of fine-grained transactions comprises to tile a loop of the computer program to generate a coarser-grained transaction of the second sequence of transactions.

Example 6 includes the subject matter of any of Examples 1-5, and wherein to coalesce the first sequence of fine-grained transactions further comprises to perform a liveness analysis of the second sequence of transactions to remove extraneous log operations.

Example 7 includes the subject matter of any of Examples 1-6, and further comprising a profiler module, wherein: the compiler analysis module is further to coalesce the first sequence of transactions to generate a third sequence of transactions, wherein the third sequence of transactions has a granularity that is more coarse than the granularity of the first sequence of transactions and that is different from the granularity of the second sequence of transactions; the profiler module is to collect an energy profile in relation to the target device for each of the first sequence of transactions, the second sequence of transactions, and the third sequence of transactions, wherein the energy profile is indicative of energy consumed by the target device to execute a transaction of the corresponding sequence of transactions; the code generation module is to select a sequence of transactions from the second sequence of transactions and the third sequence of transactions based on the energy profiles; and to generate the executable program for the target device wherein the executable program includes the first sequence of transactions and the second sequence of transactions comprises to generate the executable program for the target device in response to selection of the second sequence of transactions.

Example 8 includes the subject matter of any of Examples 1-7, and wherein: the profiler module is further to collect an available energy profile in relation to the target device; and to select the sequence of transactions from the second sequence of transactions and the third sequence of transactions further comprises to select the sequence of transactions from the second sequence of transactions and the third sequence of transactions based on the available energy profile.

Example 9 includes the subject matter of any of Examples 1-8, and wherein to collect the energy profile in relation to the target device for each of the first sequence of transactions, the second sequence of transactions, and the third sequence of transactions comprises to simulate execution of the first sequence of transactions, the second sequence of transactions, and the third sequence of transactions by the target device.

Example 10 includes the subject matter of any of Examples 1-9, and wherein to collect the energy profile in relation to the target device for each of the first sequence of transactions, the second sequence of transactions, and the third sequence of transactions comprises to receive energy profile data from a target device.

Example 11 includes a target computing device for consistent code execution, the target computing device comprising: a power management module to initialize a confidence level to a minimum value, wherein the confidence level is indicative of available energy produced by an energy harvesting unit of the target computing device; and a code execution module to (i) select an active sequence of transactions from an executable program based on a granularity of the active sequence of transactions and the confidence value, wherein the executable program includes a plurality of sequences of transactions, and wherein each sequence of transactions of the plurality of transactions has a different granularity, and (ii) execute a transaction of the active sequence of transactions in response to selection of the active sequence of transactions; wherein the power management module is further to (i) attempt to commit the transaction of the active sequence of transactions in response to execution of the transaction, (ii) determine whether—the transaction of the active sequence of transactions has successfully committed in response to an attempt to commit the transaction, and (iii) increase the confidence level in response to a determination that the transaction of the active sequence of transactions has successfully committed.

Example 12 includes the subject matter of Example 11, and further comprising a recovery module to recover execution of the executable program in response to a determination that the transaction of the active sequence of transactions has not successfully committed.

Example 13 includes the subject matter of any of Examples 11 and 12, and wherein to recover execution of the executable program comprises to reset the confidence value to the minimum value in response to the determination that the transaction of the active sequence of transactions has not successfully committed.

Example 14 includes the subject matter of any of Examples 11-13, and wherein to recover execution of the executable program further comprises to restart selection of the active sequence of transactions in response to a reset of the confidence level.

Example 15 includes the subject matter of any of Examples 11-14, and wherein to execute the transaction of the active sequence of transactions comprises to log changes made to a non-volatile memory of the target computing device in a non-volatile memory log stored in the non-volatile memory.

Example 16 includes the subject matter of any of Examples 11-15, and wherein to log the changes made to the non-volatile memory comprises to store a previous value of a non-volatile memory location in the non-volatile memory log.

Example 17 includes the subject matter of any of Examples 11-16, and wherein to execute the transaction of the active sequence of transactions further comprises to log changes made to a volatile memory of the target computing device in a volatile memory log stored in the non-volatile memory.

Example 18 includes the subject matter of any of Examples 11-17, and wherein to log the changes made to the volatile memory comprises to store a new value of a volatile memory location in the volatile memory log.

Example 19 includes the subject matter of any of Examples 11-18, and wherein to attempt to commit the transaction of the active sequence of transactions comprises to: update a commit status flag stored in the non-volatile memory to in-progress in response to an attempt to commit the transaction; copy changes from the volatile memory log to a shadow volatile memory copy stored in the non-volatile memory in response to an update of the commit status flag to in-progress; and update the commit status flag to complete in response to a copying of the changes from the volatile memory log to the shadow volatile memory copy.

Example 20 includes the subject matter of any of Examples 11-19, and further comprising a recovery module to recover execution of the executable program in response to a determination that the transaction of the active sequence of transactions has not successfully committed, wherein to recover execution of the executable program comprises to: determine whether the commit status flag is in-progress; restore the non-volatile memory based on the non-volatile memory log in response to a determination that the commit status flag is not in-progress; restore the volatile memory based on the volatile memory shadow copy; and reset the confidence level to the minimum value in response to restoration of the volatile memory.

Example 21 includes the subject matter of any of Examples 11-20, and wherein to recover execution of the executable program further comprises to: restart execution of the transaction of the active sequence of transactions in response to the determination that the commit status flag is not in-progress; and restart an attempt to commit the transaction of the active sequence of transactions in response to a determination that the commit status flag is in-progress.

Example 22 includes the subject matter of any of Examples 11-21, and wherein to recover execution of the executable program further comprises to: determine whether the commit status flag was successfully updated; and restore the commit status flag from an update status log stored in the non-volatile memory in response to a determination that the commit status was not successfully updated; wherein to determine whether the commit status flag is in-progress comprises to determine whether the commit status flag is in-progress in response to a determination of whether the commit status was successfully updated.

Example 23 includes the subject matter of any of Examples 11-22, and wherein to recover execution of the executable program further comprise to clear the non-volatile memory log and the volatile memory log in response to restoration of the non-volatile memory based on the non-volatile memory log.

Example 24 includes a method for compiling code for a target device, the method comprising: converting, by a computing device, a computer program into a first sequence of transactions; coalescing, by the computing device, the first sequence of transactions to generate a second sequence of transactions, wherein the second sequence of transactions has a granularity that is more coarse than a granularity of the first sequence of transactions; and generating, by the computing device, an executable program for the target device including the first sequence of transactions and the second sequence of transactions, wherein the executable program selects between the first sequence of transactions and the second sequence of transactions at runtime based on available energy.

Example 25 includes the subject matter of Example 24, and wherein converting the computer program into the first sequence of transactions comprises statically analyzing the computer program to identify a sequence of basic blocks, wherein each transaction of the first sequence of transactions comprises a basic block.

Example 26 includes the subject matter of any of Examples 24 and 25, and wherein converting the computer program into the first sequence of transactions comprises, for each basic block of the sequence of basic blocks: instrumenting each store operation of the corresponding basic block with a logging operation; and adding a transactional commit operation to the corresponding basic block.

Example 27 includes the subject matter of any of Examples 24-26, and wherein coalescing the first sequence of transactions comprises combining a first basic block of the first sequence of transactions with one or more basic blocks of the first sequence of transactions that are dominated by the first basic block to generate a coarser-grained transaction of the second sequence of transactions.

Example 28 includes the subject matter of any of Examples 24-27, and wherein coalescing the first sequence of fine-grained transactions comprises tiling a loop of the computer program to generate a coarser-grained transaction of the second sequence of transactions.

Example 29 includes the subject matter of any of Examples 24-28, and wherein coalescing the first sequence of fine-grained transactions further comprises performing a liveness analysis of the second sequence of transactions to remove extraneous logging operations.

Example 30 includes the subject matter of any of Examples 24-29, and further comprising: coalescing, by the computing device, the first sequence of transactions to generate a third sequence of transactions, wherein the third sequence of transactions has a granularity that is more coarse than the granularity of the first sequence of transactions and that is different from the granularity of the second sequence of transactions; collecting, by the computing device, an energy profile in relation to the target device for each of the first sequence of transactions, the second sequence of transactions, and the third sequence of transactions, wherein the energy profile is indicative of energy consumed by the target device to execute a transaction of the corresponding sequence of transactions; and selecting, by the computing device, a sequence of transactions from the second sequence of transactions and the third sequence of transactions based on the energy profiles; wherein generating the executable program for the target device including the first sequence of transactions and the second sequence of transactions comprises generating the executable program for the target device in response to selecting the second sequence of transactions.

Example 31 includes the subject matter of any of Examples 24-30, and further comprising: collecting, by the computing device, an available energy profile in relation to the target device; wherein selecting the sequence of transactions from the second sequence of transactions and the third sequence of transactions further comprises selecting the sequence of transactions from the second sequence of transactions and the third sequence of transactions based on the available energy profile.

Example 32 includes the subject matter of any of Examples 24-31, and wherein collecting the energy profile in relation to the target device for each of the first sequence of transactions, the second sequence of transactions, and the third sequence of transactions comprises simulating execution of the first sequence of transactions, the second sequence of transactions, and the third sequence of transactions by the target device.

Example 33 includes the subject matter of any of Examples 24-32, and wherein collecting the energy profile in relation to the target device for each of the first sequence of transactions, the second sequence of transactions, and the third sequence of transactions comprises receiving energy profile data from a target device.

Example 34 includes a method for consistent code execution, the method comprising: initializing, by a target computing device, a confidence level to a minimum value, wherein the confidence level is indicative of available energy produced by an energy harvesting unit of the target computing device; selecting, by the target computing device, an active sequence of transactions from an executable program based on a granularity of the active sequence of transactions and the confidence value, wherein the executable program includes a plurality of sequences of transactions, and wherein each sequence of transactions of the plurality of transactions has a different granularity; executing, by the target computing device, a transaction of the active sequence of transactions in response to selecting the active sequence of transactions; attempting, by the target computing device, to commit the transaction of the active sequence of transactions in response to executing the transaction; determining, by the target computing device, whether the transaction of the active sequence of transactions has successfully committed in response to attempting to commit the transaction; and increasing, by the target computing device, the confidence level in response to determining that the transaction of the active sequence of transactions has successfully committed.

Example 35 includes the subject matter of Example 34, and further comprising recovering, by the target computing device, execution of the executable program in response to determining that the transaction of the active sequence of transactions has not successfully committed.

Example 36 includes the subject matter of any of Examples 34 and 35, and wherein recovering execution of the executable program comprising resetting the confidence value to the minimum value in response to determining that the transaction of the active sequence of transactions has not successfully committed.

Example 37 includes the subject matter of any of Examples 34-36, and wherein recovering execution of the executable program further comprises restarting selecting the active sequence of transactions in response to resetting the confidence level.

Example 38 includes the subject matter of any of Examples 34-37, and wherein executing the transaction of the active sequence of transactions comprises logging changes made to a non-volatile memory of the target computing device in a non-volatile memory log stored in the non-volatile memory.

Example 39 includes the subject matter of any of Examples 34-38, and wherein logging the changes made to the non-volatile memory comprises storing a previous value of a non-volatile memory location in the non-volatile memory log.

Example 40 includes the subject matter of any of Examples 34-39, and wherein executing the transaction of the active sequence of transactions further comprises logging changes made to a volatile memory of the target computing device in a volatile memory log stored in the non-volatile memory.

Example 41 includes the subject matter of any of Examples 34-40, and wherein logging the changes made to the volatile memory comprises storing a new value of a volatile memory location in the volatile memory log.

Example 42 includes the subject matter of any of Examples 34-41, and wherein attempting to commit the transaction of the active sequence of transactions comprises: updating a commit status flag stored in the non-volatile memory to in-progress in response to attempting to commit the transaction; copying changes from the volatile memory log to a shadow volatile memory copy stored in the non-volatile memory in response to updating the commit status flag to in-progress; and updating the commit status flag to complete in response to copying the changes from the volatile memory log to the shadow volatile memory copy.

Example 43 includes the subject matter of any of Examples 34-42, and further comprising recovering, by the target computing device, execution of the executable program in response to determining that the transaction of the active sequence of transactions has not successfully committed, wherein recovering execution of the executable program comprises: determining whether the commit status flag is in-progress; restoring the non-volatile memory based on the non-volatile memory log in response to determining that the commit status flag is not in-progress; restoring the volatile memory based on the volatile memory shadow copy; and resetting the confidence level to the minimum value in response to restoring the volatile memory.

Example 44 includes the subject matter of any of Examples 34-43, and wherein recovering execution of the executable program further comprises: restarting executing the transaction of the active sequence of transactions in response to determining that the commit status flag is not in-progress; and restarting attempting to commit the transaction of the active sequence of transactions in response to determining that the commit status flag is in-progress.

Example 45 includes the subject matter of any of Examples 34-44, and wherein recovering execution of the executable program further comprises: determining whether the commit status flag was successfully updated; and restoring the commit status flag from an update status log stored in the non-volatile memory in response to determining that the commit status was not successfully updated; wherein determining whether the commit status flag is in-progress comprises determining whether the commit status flag is in-progress in response to determining whether the commit status was successfully updated.

Example 46 includes the subject matter of any of Examples 34-45, and wherein recovering execution of the executable program further comprises clearing the non-volatile memory log and the volatile memory log in response to restoring the non-volatile memory based on the non-volatile memory log.

Example 47 includes a computing device comprising: a processor; and a memory having stored therein a plurality of instructions that when executed by the processor cause the computing device to perform the method of any of Examples 24-46.

Example 48 includes one or more machine readable storage media comprising a plurality of instructions stored thereon that in response to being executed result in a computing device performing the method of any of Examples 24-46.

Example 49 includes a computing device comprising means for performing the method of any of Examples 24-46.

Example 50 includes a computing device for compiling code for a target device, the computing device comprising: means for converting a computer program into a first sequence of transactions; means for coalescing the first sequence of transactions to generate a second sequence of transactions, wherein the second sequence of transactions has a granularity that is more coarse than a granularity of the first sequence of transactions; and means for generating an executable program for the target device including the first sequence of transactions and the second sequence of transactions, wherein the executable program selects between the first sequence of transactions and the second sequence of transactions at runtime based on available energy.

Example 51 includes the subject matter of Example 50, and wherein the means for converting the computer program into the first sequence of transactions comprises means for statically analyzing the computer program to identify a sequence of basic blocks, wherein each transaction of the first sequence of transactions comprises a basic block.

Example 52 includes the subject matter of any of Examples 50 and 51, and wherein the means for converting the computer program into the first sequence of transactions comprises, for each basic block of the sequence of basic blocks: means for instrumenting each store operation of the corresponding basic block with a logging operation; and means for adding a transactional commit operation to the corresponding basic block.

Example 53 includes the subject matter of any of Examples 50-52, and wherein the means for coalescing the first sequence of transactions comprises means for combining a first basic block of the first sequence of transactions with one or more basic blocks of the first sequence of transactions that are dominated by the first basic block to generate a coarser-grained transaction of the second sequence of transactions.

Example 54 includes the subject matter of any of Examples 50-53, and wherein the means for coalescing the first sequence of fine-grained transactions comprises means for tiling a loop of the computer program to generate a coarser-grained transaction of the second sequence of transactions.

Example 55 includes the subject matter of any of Examples 50-54, and wherein the means for coalescing the first sequence of fine-grained transactions further comprises means for performing a liveness analysis of the second sequence of transactions to remove extraneous logging operations.

Example 56 includes the subject matter of any of Examples 50-55, and further comprising: means for coalescing the first sequence of transactions to generate a third sequence of transactions, wherein the third sequence of transactions has a granularity that is more coarse than the granularity of the first sequence of transactions and that is different from the granularity of the second sequence of transactions; means for collecting an energy profile in relation to the target device for each of the first sequence of transactions, the second sequence of transactions, and the third sequence of transactions, wherein the energy profile is indicative of energy consumed by the target device to execute a transaction of the corresponding sequence of transactions; and means for selecting a sequence of transactions from the second sequence of transactions and the third sequence of transactions based on the energy profiles; wherein the means for generating the executable program for the target device including the first sequence of transactions and the second sequence of transactions comprises means for generating the executable program for the target device in response to selecting the second sequence of transactions.

Example 57 includes the subject matter of any of Examples 50-56, and further comprising: means for collecting an available energy profile in relation to the target device; wherein the means for selecting the sequence of transactions from the second sequence of transactions and the third sequence of transactions further comprises means for selecting the sequence of transactions from the second sequence of transactions and the third sequence of transactions based on the available energy profile.

Example 58 includes the subject matter of any of Examples 50-57, and wherein the means for collecting the energy profile in relation to the target device for each of the first sequence of transactions, the second sequence of transactions, and the third sequence of transactions comprises means for simulating execution of the first sequence of transactions, the second sequence of transactions, and the third sequence of transactions by the target device.

Example 59 includes the subject matter of any of Examples 50-58, and wherein the means for collecting the energy profile in relation to the target device for each of the first sequence of transactions, the second sequence of transactions, and the third sequence of transactions comprises means for receiving energy profile data from a target device.

Example 60 includes a target computing device for consistent code execution, the target computing device comprising: means for initializing a confidence level to a minimum value, wherein the confidence level is indicative of available energy produced by an energy harvesting unit of the target computing device; means for selecting an active sequence of transactions from an executable program based on a granularity of the active sequence of transactions and the confidence value, wherein the executable program includes a plurality of sequences of transactions, and wherein each sequence of transactions of the plurality of transactions has a different granularity; means for executing a transaction of the active sequence of transactions in response to selecting the active sequence of transactions; means for attempting to commit the transaction of the active sequence of transactions in response to executing the transaction; means for determining whether the transaction of the active sequence of transactions has successfully committed in response to attempting to commit the transaction; and means for increasing the confidence level in response to determining that the transaction of the active sequence of transactions has successfully committed.

Example 61 includes the subject matter of Example 60, and further comprising means for recovering execution of the executable program in response to determining that the transaction of the active sequence of transactions has not successfully committed.

Example 62 includes the subject matter of any of Examples 60 and 61, and wherein the means for recovering execution of the executable program comprising means for resetting the confidence value to the minimum value in response to determining that the transaction of the active sequence of transactions has not successfully committed.

Example 63 includes the subject matter of any of Examples 60-62, and wherein the means for recovering execution of the executable program further comprises means for restarting selecting the active sequence of transactions in response to resetting the confidence level.

Example 64 includes the subject matter of any of Examples 60-63, and wherein the means for executing the transaction of the active sequence of transactions comprises means for logging changes made to a non-volatile memory of the target computing device in a non-volatile memory log stored in the non-volatile memory.

Example 65 includes the subject matter of any of Examples 60-64, and wherein the means for logging the changes made to the non-volatile memory comprises means for storing a previous value of a non-volatile memory location in the non-volatile memory log.

Example 66 includes the subject matter of any of Examples 60-65, and wherein the means for executing the transaction of the active sequence of transactions further comprises means for logging changes made to a volatile memory of the target computing device in a volatile memory log stored in the non-volatile memory.

Example 67 includes the subject matter of any of Examples 60-66, and wherein the means for logging the changes made to the volatile memory comprises means for storing a new value of a volatile memory location in the volatile memory log.

Example 68 includes the subject matter of any of Examples 60-67, and wherein the means for attempting to commit the transaction of the active sequence of transactions comprises: means for updating a commit status flag stored in the non-volatile memory to in-progress in response to attempting to commit the transaction; means for copying changes from the volatile memory log to a shadow volatile memory copy stored in the non-volatile memory in response to updating the commit status flag to in-progress; and means for updating the commit status flag to complete in response to copying the changes from the volatile memory log to the shadow volatile memory copy.

Example 69 includes the subject matter of any of Examples 60-68, and further comprising means for recovering execution of the executable program in response to determining that the transaction of the active sequence of transactions has not successfully committed, wherein the means for recovering execution of the executable program comprises: means for determining whether the commit status flag is in-progress; means for restoring the non-volatile memory based on the non-volatile memory log in response to determining that the commit status flag is not in-progress; means for restoring the volatile memory based on the volatile memory shadow copy; and means for resetting the confidence level to the minimum value in response to restoring the volatile memory.

Example 70 includes the subject matter of any of Examples 60-69, and wherein the means for recovering execution of the executable program further comprises: means for restarting executing the transaction of the active sequence of transactions in response to determining that the commit status flag is not in-progress; and means for restarting attempting to commit the transaction of the active sequence of transactions in response to determining that the commit status flag is in-progress.

Example 71 includes the subject matter of any of Examples 60-70, and wherein the means for recovering execution of the executable program further comprises: means for determining whether the commit status flag was successfully updated; and means for restoring the commit status flag from an update status log stored in the non-volatile memory in response to determining that the commit status was not successfully updated; wherein the means for determining whether the commit status flag is in-progress comprises means for determining whether the commit status flag is in-progress in response to determining whether the commit status was successfully updated.

Example 72 includes the subject matter of any of Examples 60-71, and wherein the means for recovering execution of the executable program further comprises means for clearing the non-volatile memory log and the volatile memory log in response to restoring the non-volatile memory based on the non-volatile memory log.

The invention claimed is:

1. A computing device for compiling code for a target device, the computing device comprising:
a compiler analysis module to (i) convert a computer program into a first sequence of transactions and (ii) coalesce the first sequence of transactions to generate a second sequence of transactions, wherein the second sequence of transactions has a granularity that is more coarse than a granularity of the first sequence of transactions; and
a code generation module to generate an executable program for the target device, wherein the executable program includes the first sequence of transactions and the second sequence of transactions, and wherein the executable program selects between the first sequence of transactions and the second sequence of transactions at runtime based on available energy.

2. The computing device of claim 1, wherein to convert the computer program into the first sequence of transactions comprises to statically analyze the computer program to identify a sequence of basic blocks, wherein each transaction of the first sequence of transactions comprises a basic block.

3. The computing device of claim 1, further comprising a profiler module, wherein:
the compiler analysis module is further to coalesce the first sequence of transactions to generate a third sequence of transactions, wherein the third sequence of transactions has a granularity that is more coarse than the granularity of the first sequence of transactions and that is different from the granularity of the second sequence of transactions;
the profiler module is to collect an energy profile in relation to the target device for each of the first sequence of transactions, the second sequence of transactions, and the third sequence of transactions, wherein the energy profile is indicative of energy consumed by the target device to execute a transaction of the corresponding sequence of transactions;
the code generation module is to select a sequence of transactions from the second sequence of transactions and the third sequence of transactions based on the energy profiles; and
to generate the executable program for the target device wherein the executable program includes the first sequence of transactions and the second sequence of transactions comprises to generate the executable program for the target device in response to selection of the second sequence of transactions.

4. The computing device of claim 3, wherein:
the profiler module is further to collect an available energy profile in relation to the target device; and
to select the sequence of transactions from the second sequence of transactions and the third sequence of transactions further comprises to select the sequence of transactions from the second sequence of transactions and the third sequence of transactions based on the available energy profile.

5. One or more non-transitory, machine readable storage media comprising a plurality of instructions that in response to being executed cause a computing device to:
convert a computer program into a first sequence of transactions;
coalesce the first sequence of transactions to generate a second sequence of transactions, wherein the second sequence of transactions has a granularity that is more coarse than a granularity of the first sequence of transactions; and
generate an executable program for the target device including the first sequence of transactions and the second sequence of transactions, wherein the executable program selects between the first sequence of transactions and the second sequence of transactions at runtime based on available energy.

6. The one or more non-transitory, machine readable storage media of claim 5, wherein to convert the computer program into the first sequence of transactions comprises to statically analyze the computer program to identify a sequence of basic blocks, wherein each transaction of the first sequence of transactions comprises a basic block.

7. The one or more non-transitory, machine readable storage media of claim 5, further comprising a plurality of instructions that in response to being executed cause the computing device to:
coalesce the first sequence of transactions to generate a third sequence of transactions, wherein the third sequence of transactions has a granularity that is more coarse than the granularity of the first sequence of transactions and that is different from the granularity of the second sequence of transactions;
collect an energy profile in relation to the target device for each of the first sequence of transactions, the second sequence of transactions, and the third sequence of transactions, wherein the energy profile is indicative of energy consumed by the target device to execute a transaction of the corresponding sequence of transactions; and select a sequence of transactions from the second sequence of transactions and the third sequence of transactions based on the energy profiles;

wherein to generate the executable program for the target device including the first sequence of transactions and the second sequence of transactions comprises to generate the executable program for the target device in response to selecting the second sequence of transactions.

8. The one or more non-transitory, machine readable storage media of claim 7, further comprising a plurality of instructions that in response to being executed cause the computing device to:

collect an available energy profile in relation to the target device;

wherein to select the sequence of transactions from the second sequence of transactions and the third sequence of transactions further comprises to select the sequence of transactions from the second sequence of transactions and the third sequence of transactions based on the available energy profile.

9. A target computing device for consistent code execution, the target computing device comprising:

a power management module to initialize a confidence level to a minimum value, wherein the confidence level is indicative of available energy produced by an energy harvesting unit of the target computing device; and a code execution module to (i) select an active sequence of transactions from an executable program based on a granularity of the active sequence of transactions and the confidence value, wherein the executable program includes a plurality of sequences of transactions, and wherein each sequence of transactions of the plurality of transactions has a different granularity, and (ii) execute a transaction of the active sequence of transactions in response to selection of the active sequence of transactions;

wherein the power management module is further to (i) attempt to commit the transaction of the active sequence of transactions in response to execution of the transaction, (ii) determine whether the transaction of the active sequence of transactions has successfully committed in response to an attempt to commit the transaction, and (iii) increase the confidence level in response to a determination that the transaction of the active sequence of transactions has successfully committed.

10. The target computing device of claim 9, further comprising a recovery module to recover execution of the executable program in response to a determination that the transaction of the active sequence of transactions has not successfully committed.

11. The target computing device of claim 10, wherein to recover execution of the executable program comprises to reset the confidence value to the minimum value in response to the determination that the transaction of the active sequence of transactions has not successfully committed.

12. The target computing device of claim 9, wherein to execute the transaction of the active sequence of transactions comprises to log changes made to a non-volatile memory of the target computing device in a non-volatile memory log stored in the non-volatile memory.

13. The target computing device of claim 12, wherein to execute the transaction of the active sequence of transactions further comprises to log changes made to a volatile memory of the target computing device in a volatile memory log stored in the non-volatile memory.

14. The target computing device of claim 13, wherein to attempt to commit the transaction of the active sequence of transactions comprises to:

update a commit status flag stored in the non-volatile memory to in-progress in response to an attempt to commit the transaction;

copy changes from the volatile memory log to a shadow volatile memory copy stored in the non-volatile memory in response to an update of the commit status flag to in-progress; and update the commit status flag to complete in response to a copying of the changes from the volatile memory log to the shadow volatile memory copy.

15. The target computing device of claim 14, further comprising a recovery module to recover execution of the executable program in response to a determination that the transaction of the active sequence of transactions has not successfully committed, wherein to recover execution of the executable program comprises to:

determine whether the commit status flag is in-progress;

restore the non-volatile memory based on the non-volatile memory log in response to a determination that the commit status flag is not in-progress;

restore the volatile memory based on the volatile memory shadow copy; and reset the confidence level to the minimum value in response to restoration of the volatile memory.

16. The target computing device of claim 15, wherein to recover execution of the executable program further comprises to:

restart execution of the transaction of the active sequence of transactions in response to the determination that the commit status flag is not in-progress; and restart an attempt to commit the transaction of the active sequence of transactions in response to a determination that the commit status flag is in-progress.

17. One or more non-transitory, machine readable storage media comprising a plurality of instructions that in response to being executed cause a target computing device to:

initialize a confidence level to a minimum value, wherein the confidence level is indicative of available energy produced by an energy harvesting unit of the target computing device;

select an active sequence of transactions from an executable program based on a granularity of the active sequence of transactions and the confidence value, wherein the executable program includes a plurality of sequences of transactions, and wherein each sequence of transactions of the plurality of transactions has a different granularity;

execute a transaction of the active sequence of transactions in response to selecting the active sequence of transactions;

attempt to commit the transaction of the active sequence of transactions in response to executing the transaction;

determine whether the transaction of the active sequence of transactions has successfully committed in response to attempting to commit the transaction; and increase the confidence level in response to determining that the transaction of the active sequence of transactions has successfully committed.

18. The one or more non-transitory, machine readable storage media of claim 17, further comprising a plurality of instructions that in response to being executed cause the target computing device to recover execution of the executable program in response to determining that the transaction of the active sequence of transactions has not successfully committed.

19. The one or more non-transitory, machine readable storage media of claim 17, wherein to recover execution of the executable program comprising to reset the confidence value to the minimum value in response to determining that the transaction of the active sequence of transactions has not successfully committed.

20. The one or more non-transitory, machine readable storage media of claim 17, wherein to execute the transaction of the active sequence of transactions comprises to log changes made to a non-volatile memory of the target computing device in a non-volatile memory log stored in the non-volatile memory.

21. The one or more non-transitory, machine readable storage media of claim 20, wherein to execute the transaction of the active sequence of transactions further comprises to log changes made to a volatile memory of the target computing device in a volatile memory log stored in the non-volatile memory.

22. The one or more non-transitory, machine readable storage media of claim 21, wherein to attempt to commit the transaction of the active sequence of transactions comprises to:
update a commit status flag stored in the non-volatile memory to in-progress in response to attempting to commit the transaction;
copy changes from the volatile memory log to a shadow volatile memory copy stored in the non-volatile memory in response to updating the commit status flag to in-progress; and update the commit status flag to complete in response to copying the changes from the volatile memory log to the shadow volatile memory copy.

23. The one or more non-transitory, machine readable storage media of claim 22, further comprising a plurality of instructions that in response to being executed cause the target computing device to recover execution of the executable program in response to determining that the transaction of the active sequence of transactions has not successfully committed, wherein to recover execution of the executable program comprises to:
determine whether the commit status flag is in-progress;
restore the non-volatile memory based on the non-volatile memory log in response to determining that the commit status flag is not in-progress;
restore the volatile memory based on the volatile memory shadow copy; and
reset the confidence level to the minimum value in response to restoring the volatile memory.

24. The one or more non-transitory, machine readable storage media of claim 23, wherein to recover execution of the executable program further comprises to:
restart executing the transaction of the active sequence of transactions in response to determining that the commit status flag is not in-progress; and
restart attempting to commit the transaction of the active sequence of transactions in response to determining that the commit status flag is in-progress.

* * * * *